(12) United States Patent
Narita et al.

(10) Patent No.: US 8,864,443 B2
(45) Date of Patent: Oct. 21, 2014

(54) SEALING DEVICE FOR STEAM TURBINES AND METHOD FOR CONTROLLING SEALING DEVICE

(75) Inventors: Kenjiro Narita, Hitachinaka (JP);
Haruyuki Yamazaki, Tokai (JP);
Takeshi Kudo, Hitachinaka (JP);
Kenichi Murata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 566 days.

(21) Appl. No.: 13/181,970

(22) Filed: Jul. 13, 2011

(65) Prior Publication Data
US 2012/0014778 A1 Jan. 19, 2012

(30) Foreign Application Priority Data

Jul. 14, 2010 (JP) ................................ 2010-159271
Jan. 14, 2011 (JP) ................................ 2011-005382

(51) Int. Cl.
| F01D 11/00 | (2006.01) |
| F01D 11/22 | (2006.01) |
| F16J 15/44 | (2006.01) |
| F01D 11/06 | (2006.01) |

(52) U.S. Cl.
CPC .............. *F01D 11/22* (2013.01); *F16J 15/445* (2013.01); *F16J 15/442* (2013.01); *F01D 11/06* (2013.01); *F05D 2220/31* (2013.01)
USPC ..... 415/113; 415/118; 415/174.2; 415/174.4; 415/174.5

(58) Field of Classification Search
CPC .............................. F01D 11/025; F01D 1/001
USPC ................ 415/113, 118, 174.2, 174.3, 174.4, 415/174.5, 230, 231; 277/413, 415
See application file for complete search history.

(56) References Cited

U.S. PATENT DOCUMENTS

| 5,056,986 A | 10/1991 | Silvestri, Jr. et al. |
| 5,603,510 A * | 2/1997 | Sanders ........................ 277/413 |
| 6,622,490 B2 * | 9/2003 | Ingistov ........................ 60/782 |
| 8,105,021 B2 * | 1/2012 | Glahn et al. ............... 415/168.2 |

(Continued)

FOREIGN PATENT DOCUMENTS

| EP | 1 533 479 A2 | 5/2005 |
| EP | 2 182 174 A2 | 5/2010 |

(Continued)

OTHER PUBLICATIONS

European Search Report dated Dec. 27, 2011 (Seven (7) pages).

(Continued)

*Primary Examiner* — Ninh H Nguyen
(74) *Attorney, Agent, or Firm* — Crowell & Moring LLP

(57) ABSTRACT

A sealing structure in which free-cutting spacers on a sealing base plate and sealing fins on a rotor are opposed to each other is provided. The sealing base plate is disposed so as to be movable in an axial direction of the rotor. When a steam turbine increases in load, a pressure head moves in an axial steam-pressure loading direction of the rotor and the sealing base plate connected to the pressure head moves in the axial steam-pressure loading direction. Since the free-cutting spacers at positions opposed to those of the sealing fins existing after the movement of the sealing base plate are maintained in a non-contact state, clearances between the sealing fins and the free-cutting spacers are dimensionally minimized.

14 Claims, 18 Drawing Sheets

(56) References Cited

U.S. PATENT DOCUMENTS

| | | | |
|---|---|---|---|
| 2003/0185669 A1* | 10/2003 | Brauer et al. | ............... 415/111 |
| 2004/0096319 A1 | 5/2004 | Uchida et al. | |
| 2007/0292258 A1 | 12/2007 | Kirchhof et al. | |
| 2008/0247865 A1 | 10/2008 | Fiala et al. | |
| 2009/0142187 A1 | 6/2009 | Narita et al. | |

FOREIGN PATENT DOCUMENTS

| | | |
|---|---|---|
| JP | 61-250304 A | 11/1986 |
| JP | 8-284609 A | 10/1996 |
| JP | 2002-70505 A | 3/2002 |
| JP | 2002-228013 A | 8/2002 |
| JP | 2007-162482 A | 6/2007 |
| JP | 2008-223660 A | 9/2008 |
| JP | 2008-297980 A | 12/2008 |

OTHER PUBLICATIONS

Japanese language Office Action with translations dated Jul. 2, 2013 (seven (7) pages).

Japanese-language Office Action dated Oct. 23, 2012, 3 pages.

* cited by examiner

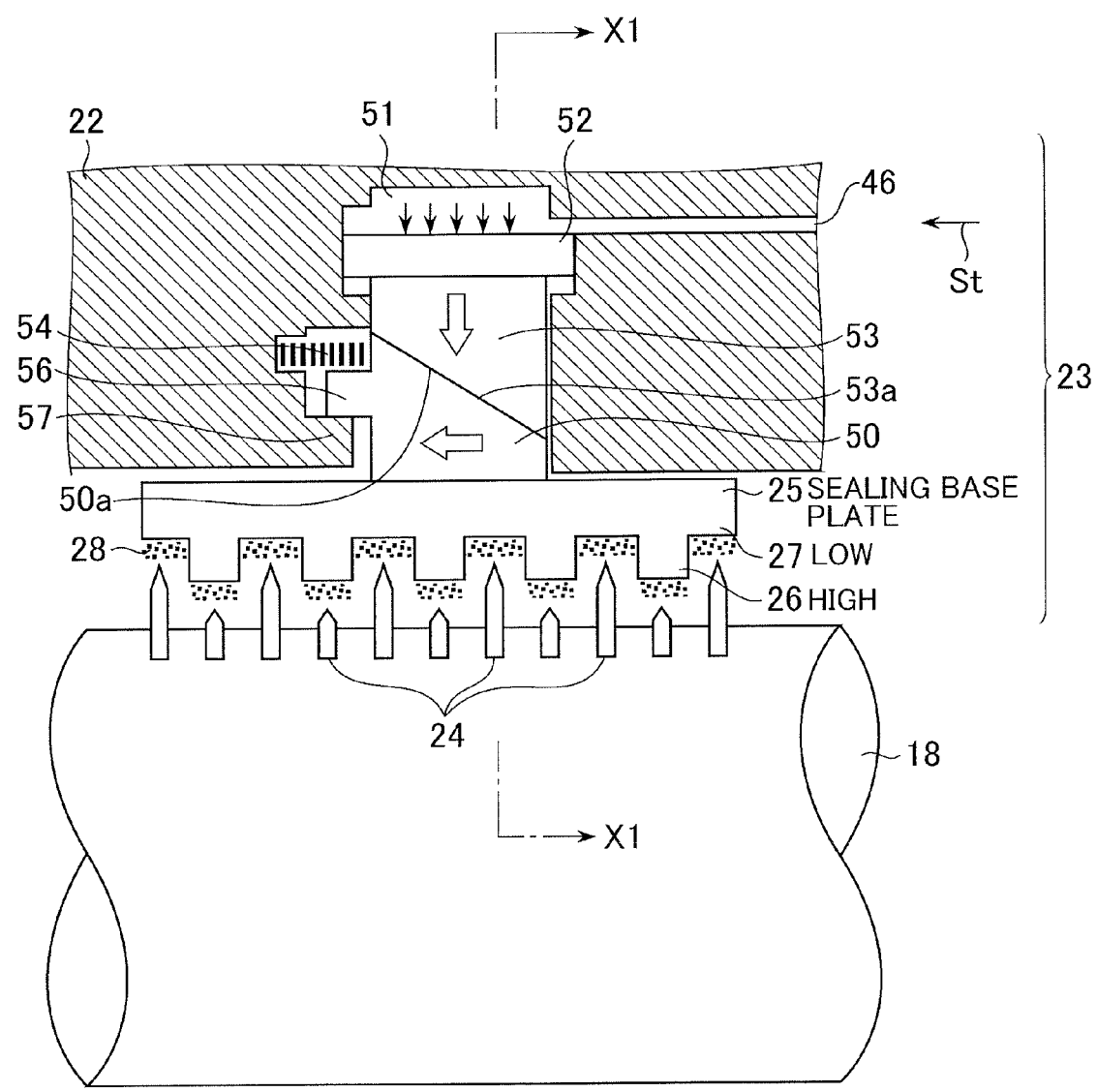

SEALING DEVICE FOR STEAM TURBINES AND METHOD FOR CONTROLLING SEALING DEVICE

BACKGROUND OF THE INVENTION

1. Field of the Invention

The present invention relates to a sealing device for steam turbines.

2. Description of the Related Art

Power-generating plants that generate electric power by rotating steam turbines with the steam generated by boilers or the like are commonly equipped with, in order from the upstream side of the flow of the steam, high-pressure turbines, intermediate-pressure turbines, and low-pressure turbines, as the steam turbines. The steam that has been used to rotate a low-pressure turbine is introduced into a condenser via an exhaust hood and then condensed by the condenser to become feedwater. The feedwater is recycled into the steam generator.

In the steam turbines constituting such a power plant, stationary blades fixed to the inside of a casing are arranged between the moving blades that rotate integrally with a rotor, and stages including the stationary blades and the moving blades are formed.

The steam that has been introduced into the casing of the steam turbines flows through the inside of the casing and passes through alternate spaces between the stationary blades and the moving blades fixed to the rotor rotatably supported by the casing. The steam expands during the alternate movements, and rotates the rotor. The steam passes through the moving blades equipped at the most downstream position on the rotor, that is, the moving blades of a final stage, and is released from the casing.

More specifically, the stationary blades are most often fixed to the inside of a diaphragm mounted internally to the casing, and the moving blades are fixedly mounted on an outer surface of the rotor to rotate integrally with the rotor. The casing and the diaphragm are most commonly divided into two sections, upper and lower, from a viewpoint of ease in maintenance.

In such a steam turbine, since steam rotates the rotor by rotating the moving blades, it is required that sealing performance between a fixed region and rotating region of the turbine be improved to use the steam more efficiently with minimum steam leakage from such clearances as between the rotor and the diaphragm containing the stationary blades and retained in the casing, and between a distal end of each moving blade and the casing.

If the clearances between the rotating region and the fixed region are dimensionally reduced for improved sealing performance, however, damage to sealing fins due to contact between the sealing fins and the rotor is more likely to occur. If the damage actually occurs, this in turn causes a problem of increased steam leakage.

Fin contact between the rotating region and the fixed region is considered to be caused by thermal deformation of the casing, the diaphragm, and/or the like. It is well known that a difference in thermally insulated state between the upper and lower sections of the casing causes a difference in surface temperature between both, thus elongating the casing more significantly on the upper side than on the lower side. That is to say, the casing becomes bulged or humped upward to suffer thermal bending deformation, which moves the casing (fixed region) upward relative to the rotor (rotating region) and causes rotor-fin contact.

If a difference in temperature occurs in a radial direction of the diaphragm, the diaphragm becomes hotter on its inner surface than on its outer surface, with the result that the inner surface of the diaphragm elongates relative to the outer surface. This thermal elongation causes the diaphragm to suffer bending deformation, and the inner surface of the diaphragm to move upward relative to an end portion of its outer-surface dividing face. The lower diaphragm is fixed at the end portion of its outer-surface dividing face to the inside of the casing, and the inner-surface position of the lower diaphragm rises in relative fashion with respect to the position of the casing. In the end, the diaphragm (fixed region) moves upward with respect to the rotor (rotating region) and this upward movement becomes another cause of rotor-fin contact.

For steam turbine operation in recent years, reduction in startup time is being demanded and it has traditionally been becoming common to increase the temperature and flow rate of steam within a shorter time. Particularly in this case, differences in temperature are prone to occur in a radial direction of the diaphragm, hence making thermal deformation more likely to result.

The thermal deformation moves the casing (fixed region) upward relative to the rotor (rotating region) and becomes causative in rotor-fin contact.

In order to address the problems concerned, JP-2002-228013-A, for example, discloses a technique relating to a sealing unit having a labyrinth sealing device which includes sealing fins between a rotating region such as a rotor, and a fixed region such as a diaphragm, and which uses a highly workable, metallic free-cutting member (abradable material) at a position opposed to each fin. According to JP-2002-228013-A, the technique disclosed therein is effective, for example, for avoiding damage to the fins and thus reducing a quantitative increase in steam leakage, since the fins cut the abradable material in a case of contact between the fins and the abradable material.

SUMMARY OF THE INVENTION

However, arranging the fins and the abradable material to dimensionally minimize the clearances between the rotating region and the fixed region in an attempt to improve sealing performance causes free-cutting of the abradable material due to more frequent contact between the fins and the abradable material. Consequently, a clearance newly formed will dimensionally increase according to the particular amount of free-cutting. The increase in clearance due to free-cutting will, in turn, increase steam leakage from the new clearance. The technique disclosed in JP-2002-228013-A does not allow for the increase in steam leakage from the new clearance formed by the free-cutting of the abradable material.

In addition, dimensionally increasing the clearance between the fins and the abradable material in order to prevent contact between both will dimensionally increase the clearances between the rotating region and the fixed region, and hence, steam leakage, thereby rendering it hopeless to improve steam turbine efficiency. Accordingly, it is an object of the present invention to provide a sealing structure capable of avoiding increases in the amount of steam leakage from any clearances newly formed by further free-cutting of an abradable material, thus improving the sealing structure in sealing performance, and hence improving steam turbine efficiency.

In order to solve the foregoing problems, an aspect of the present invention is a sealing device for a steam turbine, the sealing device including, in addition to a set of sealing fins in both or either of a rotating region and fixed region of the steam turbine, a set of spacers using a free-cutting metal on the rotating region or fixed region opposed to the sealing fins, and the sealing fins or the spacers are provided on the fixed region so as to be movable in an axial direction of a rotor with respect to the rotating region.

The sealing device according to the present invention causes no dimensional increase in clearance due to free-cutting of an abradable material, avoids increases in the amount of steam leakage from clearances, and thus improves sealing performance and hence, steam turbine efficiency.

BRIEF DESCRIPTION OF THE DRAWINGS

FIG. 10 is an enlarged view of a labyrinth sealing device according to a further embodiment;

DETAILED DESCRIPTION OF PREFERRED EMBODIMENTS

Hereunder, embodiments of the present invention will be described in detail referring to the accompanying drawings as appropriate.

(First Embodiment)

Figure 1:
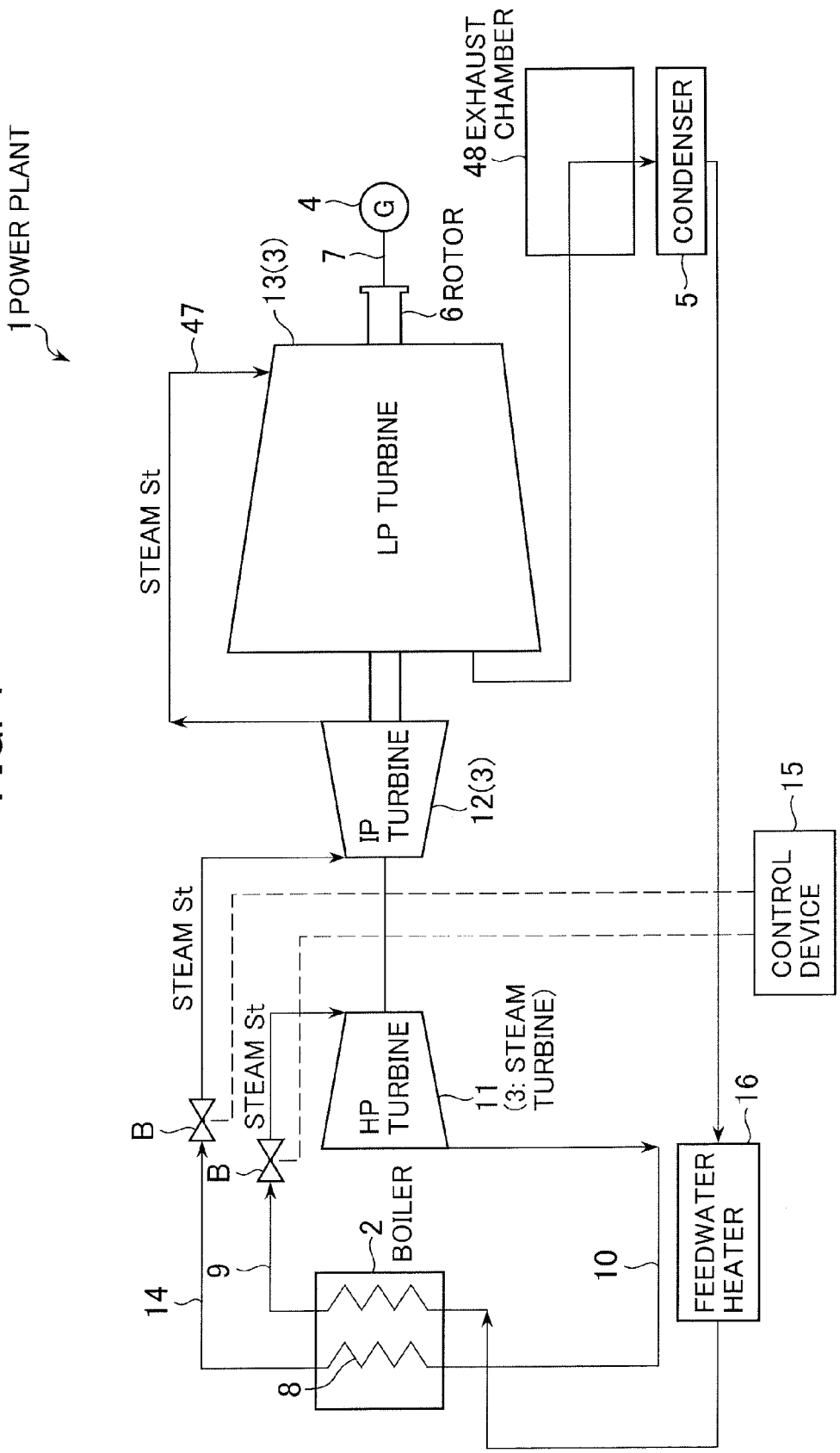
FIG. 1 is a systematic diagram showing schematically a power plant equipped with a steam turbine according to an embodiment of the present invention.

FIG. 1 is a systematic diagram showing schematically a power plant equipped with a steam turbine according to an embodiment of the present invention. As shown in FIG. 1, the power plant 1 includes a boiler 2, a steam turbine 3 (including a high-pressure turbine 11, an intermediate-pressure turbine 12, and a low-pressure turbine 13), a power generator 4, a condenser 5, and so on. The low-pressure turbine 13 has a rotor 6 coupled to a driving shaft 7 of the generator 4, which is then driven by rotation of the low-pressure turbine 13 to generate electric power.

The boiler 2 is a steam generator accommodating a reheater 8, and is connected to an inlet side of the high-pressure turbine 11 via a pipe 9. The high-pressure turbine 11 is connected at its outlet side to the reheater 8 of the boiler 2 via a pipe 10. The reheater 8 is connected to an inlet side of the intermediate-pressure turbine 12 via a pipe 14, and the intermediate-pressure turbine 12 is connected at its outlet side to an inlet side of the low-pressure turbine 13 via a pipe 47.

The pipe 9 and the pipe 14 both include a regulating valve B, and the regulating valves B on the pipes 9, 14 function as control valves to control the amounts of steam St flowing into the high-pressure turbine 11 and the intermediate-pressure turbine 12, respectively. The regulating valves B are controlled by a control device 15, whereby the amounts of steam St flowing into the high-pressure turbine 11 and the intermediate-pressure turbine 12 are controlled.

The steam St that has been generated by the boiler 2 flows into the low-pressure turbine 13 via the high-pressure turbine 11 and the intermediate-pressure turbine 12, to rotate the rotor 6 equipped in the low-pressure turbine 13. The steam St, upon rotating the rotor 6 and being released from the low-pressure turbine 13, is condensed by the condenser 5 via an exhaust chamber 48 to become feedwater, which is then supplied to a feedwater heater 16. The steam St as feedwater, is next heated by the feedwater heater 16, then further forwarded to another feedwater heater, a high-pressure feedwater pump, and/or the like, and returned into the boiler 2, the steam generator.

Figure 2:
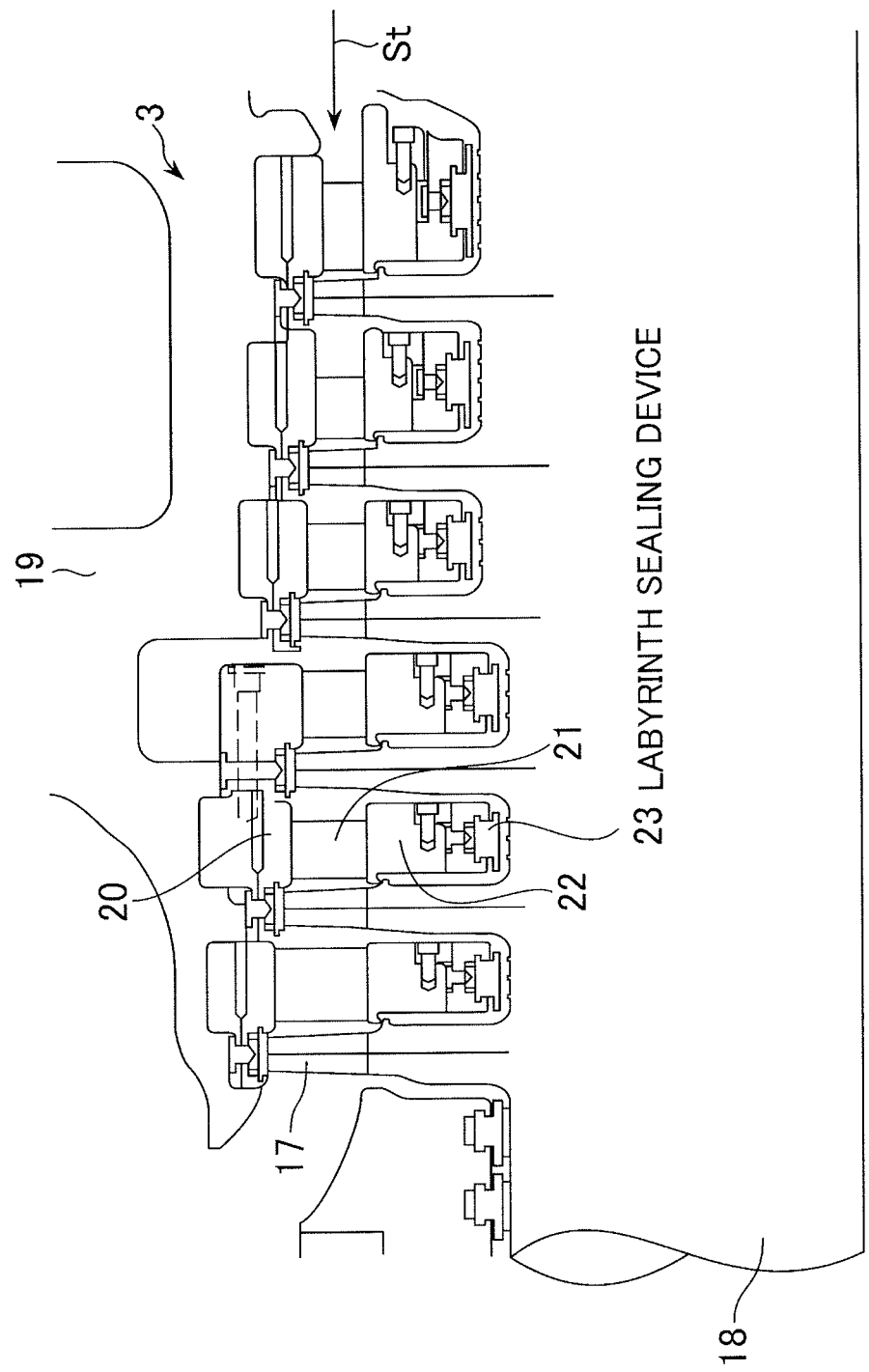
FIG. 2 is a partly enlarged view of the steam turbine according to the embodiment.

As shown in FIG. 2, a plurality of moving blades 17 each fixed in an oriented condition along an outer circumferential surface of the rotor 18 are arranged axially in a plurality of rows in the steam turbine 3.

A casing 19 internally containing the rotor 18 and the moving blades 17, and a plurality of stationary blades 21 each fixed to the casing 19 via a diaphragm outer ring 20 are also equipped in the steam turbine 3. Each stationary blade 21 and each moving blade 17 are arranged at alternate positions in the axial direction of the rotor 18 and thus form stages. The rotor 18 rotates in its circumferential direction.

The boiler-generated steam St, upon flowing into the casing 19 of the steam turbine 3, circulates through alternate spaces between each stationary blade 21 and moving blade 17 while decreasing in pressure and expanding, thereby to rotate the rotor 18.

The steam St that has passed through the moving blades 17 equipped at the most downstream position on the rotor 18, that is, the moving blades of a final stage, is released from the casing 19.

To rotate the rotor 18 efficiently with the steam St flowing through the inside of the casing 19, the steam turbine 3 thus constructed is required to improve sealing performance between the rotor 18 and moving blades 17 that are a rotating region, and the casing 19 and stationary blades 21 that are a fixed region, and suppress any amounts of steam St leaking from clearances between the rotating region and the fixed region, that is, steam leakage.

For example, for reduced resistance to the rotation of the rotor 18, a clearance may need to be provided between the rotor 18 and a nozzle diaphragm inner ring 22 disposed at a distal end of each stationary blade. This clearance, however, causes leakage of the steam St flowing into the stationary blade 21.

Since leakage steam St does not contribute to the rotation of the rotor 18, an increase in the amount of leakage steam reduces efficiency of the steam turbine 3. Reducing the amount of leakage steam, therefore, is preferred for improved efficiency of the steam turbine 3.

For this reason, it is common to render the clearances between the rotor 18 and the stationary blades 21 smaller by inserting a labyrinth sealing device 23 or any other appropriate device between each nozzle diaphragm inner ring 22 and the rotor 18. Constructing the turbine in this way improves sealing performance between the rotor 18 and the stationary blades 21, reducing the amount of leakage steam.

Figure 3:
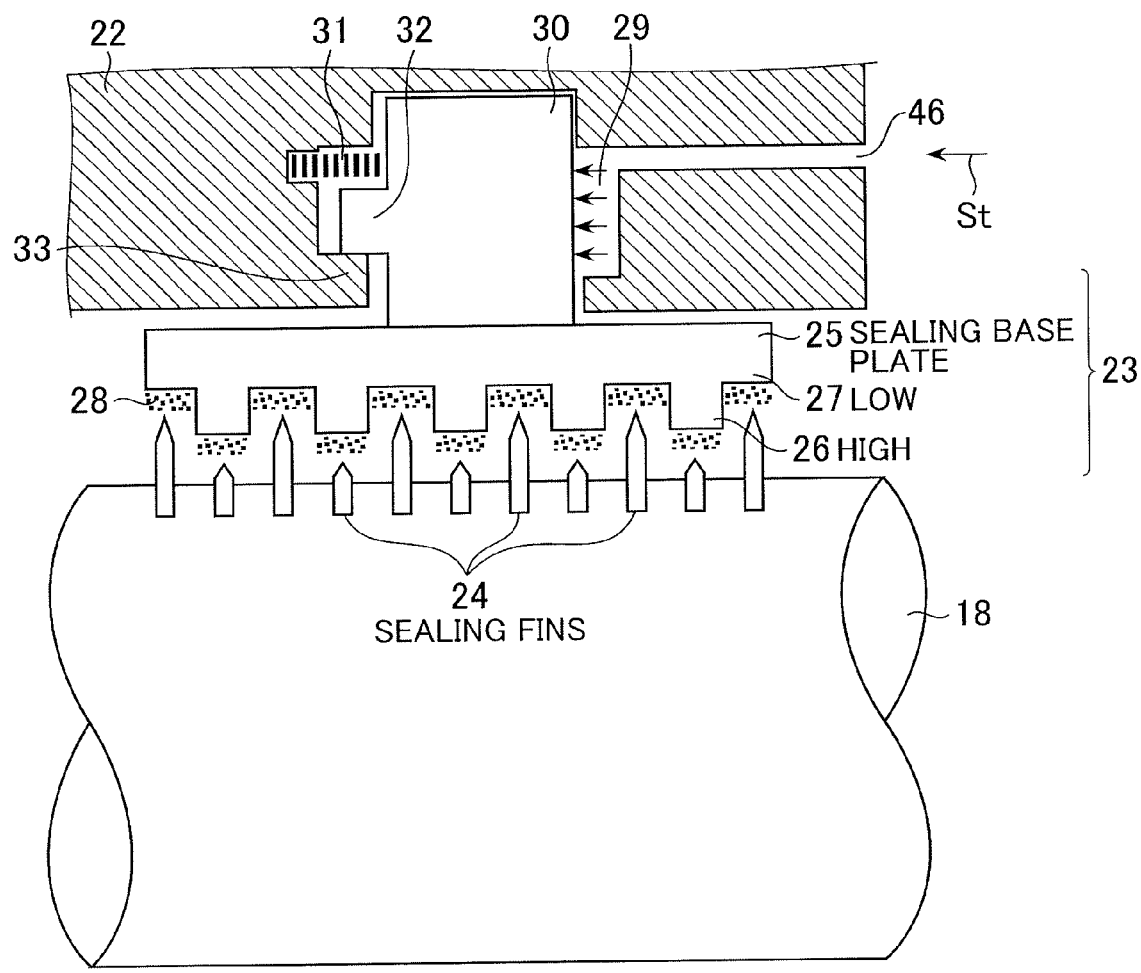
FIG. 3 is an enlarged view of a labyrinth sealing device used in FIG. 2.

As shown in FIG. 3, for a high-low type of labyrinth sealing device 23 according to the embodiment, a plurality of fixed sealing fins 24 are arranged on the rotor 18.

A sealing base plate 25 for the nozzle diaphragm inner ring 22 has a plurality of high sections 26 and low sections 27 lined up at predetermined intervals in the axial direction of the rotor 18 and formed circumferential direction of the rotor.

In addition, the high and low sections 26, 27 on the sealing base plate 25, and the sealing fins 24 on the rotor 18 are arranged in the axial direction of the rotor 18 so that the former two face the latter.

The labyrinth sealing device 23 with the plurality of sealing fins 24 is thus constructed.

Traditionally, the high and low sections 26, 27 on the sealing base plate 25, and the sealing fins 24 on the rotor 18 are arranged in a non-contact condition. This arrangement creates very small clearances between the sealing fins 24 and the sealing base plate 25, thereby reducing resistance to the rotation of the rotor 18, or rotational resistance.

The steam St passing through these clearances, however, will become leakage steam without contributing to the rotation of the rotor 18. The leakage steam will then cause steam leakage loss and reduce the efficiency of the steam turbine 3.

In the present embodiment, therefore, a free-cutting spacer 28 formed from a free-cutting metal is mounted between each sealing fin 24 on the rotor 18 and the sealing base plate 25.

Furthermore, the sealing base plate 25 with the free-cutting spacers 28 is disposed to be movable in the axial direction of the rotor 18.

This arrangement enables the free-cutting spacers 28 on the stationary blade side (see FIG. 2) that is the fixed region, to move axially with respect to the rotor 18 that is the rotating region.

A method of mounting the free-cutting spacers 28 on the sealing base plate 25 is not limited; the spacers may be fixed by brazing, for example.

Figure 4A:
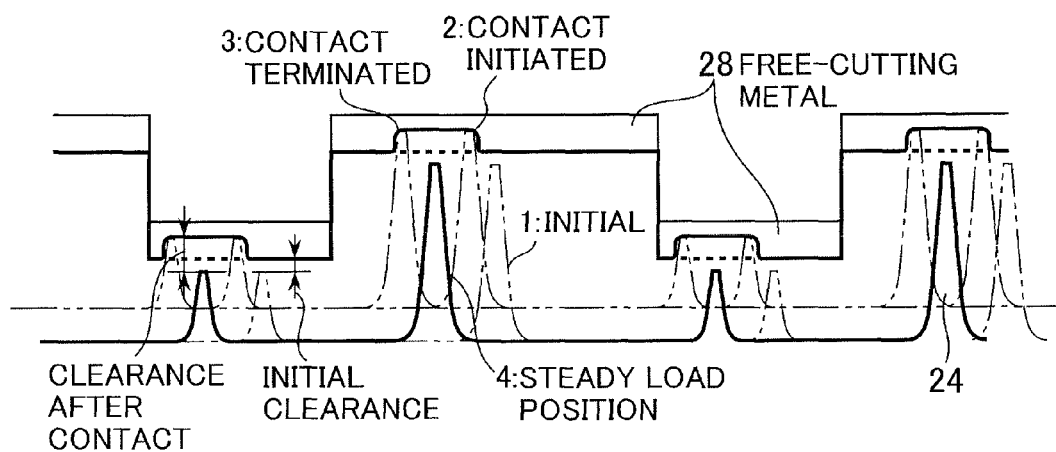
FIGS. 4A and 4B are diagrams that illustrate differences in effectiveness between a labyrinth sealing device in a conventional technique and that of the embodiment shown in FIG. 3.
Figure 4B:
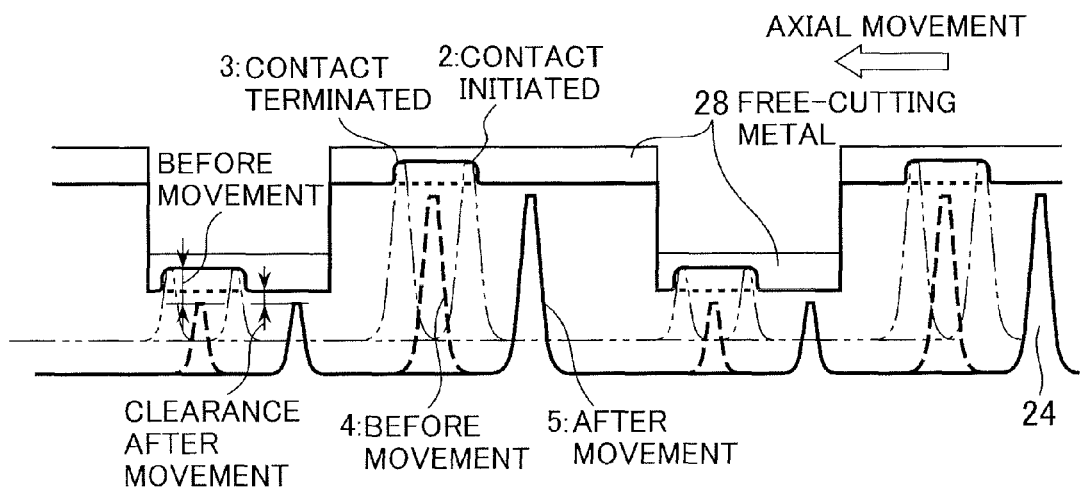

The free-cutting metal forming the free-cutting spacers 28 according to the present embodiment is an abradable material excellent in workability. For example, even if the free-cutting spacers 28 on the sealing base plate 25 and distal ends of the sealing fins 24 on the rotor 18 come into contact during rotor rotation, only the free-cutting spacers 28 are abraded and the sealing fins 24 remain undamaged. This state is shown in FIG. 4B.

In order to facilitate understanding of the present embodiment, conventional technology and a problem associated therewith are described below using the accompanying drawings.

In a conventional technique that uses spacers formed from a highly workable material such as an abradable material, contact between the free-cutting spacers 28 and sealing fins 24 abrades the free-cutting spacers 28 and generates clearances larger than preset ones, above the sealing fins 24. This state is shown in FIG. 4A. If the clearances are dimensionally increased by such contact, since the amount of leakage steam at the seals will increase according to the particular dimensional increases in the clearances, the increase in the amount of leakage steam will cause a problem of a decrease in steam turbine efficiency.

That is to say, the conventional technique causes the following problem. Contact between the free-cutting spacers 28 and the sealing fins 24 is estimated to occur through four process steps: (1) under an initial state of turbine assembly, a small amount of steam flows into the steam turbine, (2) the free-cutting spacers 28 and the sealing fins 24 initiate contact for reasons such as thermal deformation of the diaphragm, thermal deformation of the casing, or thermal elongation of the rotor, (3) then terminate contact after thermally stabilizing over time, and (4) reach a steady load position. Thermal stability is obtained and the high-temperature high-pressure steam St is introduced into the steam turbine to enable steady operation for stable power generation. The clearances in this case will have their magnitude significantly increased relative to that of the clearances existing during the initial state (1) of turbine assembly.

A consequential increase in the amount of leakage at the seals during steady operation will result in the problem of reduced turbine efficiency.

A problem associated with the conventional technique has been discussed above. Focus will be returned to the description of the present embodiment.

The free-cutting spacers 28 in the present embodiment are constructed to be axially movable with respect to the rotor 18 that is the rotating region. As shown in FIG. 4B, for example, upon the high-temperature high-pressure steam St being introduced into the steam turbine to implement steady operation after thermal stability has been reached and contact terminated, the free-cutting spacers 28 move axially with respect to the rotor 18, the rotating region. The free-cutting spacers 28 at the positions opposed to those of the sealing fins 24 existing after the movement, are maintained in a non-contact state. The clearances above the sealing fins 24, therefore, remain nearly equal to those existing under the initial state of the turbine. In other words, even if the free-cutting spacers 28 have their surfaces abraded by contact, since the clearances above the seals during steady operation are left dimensionally equal to initial ones, high turbine efficiency is maintained because of no increase in leakage.

Since the free-cutting spacers 28 are mounted between the sealing base plate 25 and the sealing fins 24 on the rotor 18 and since the sealing base plate 25 with the free-cutting spacers 28 is mounted to be movable in the axial direction of the rotor 18, even if the sealing fins 24 and the free-cutting spacers 28 come into contact, this causes no such decrease in turbine efficiency that arises from an increase in leakage from the seals during steady operation. This develops an excellent effect in that even if the surfaces of the free-cutting spacers 28 are abraded by contact, high turbine efficiency is maintained without an increase in leakage.

Additionally, the sealing base plate 25 in the present embodiment is mounted so as to be movable in the axial direction of the rotor 18. As shown in FIG. 3, the nozzle diaphragm inner ring 22 includes a hollow preload chamber 29 in which a pressure head 30 is equipped to reciprocate in the axial direction of the rotor 18. The pressure head 30, resiliently supported by a return spring 31 (urging means), is urged by the return spring 31 with a considerable urging force acting in a direction opposite to that in which the steam is forced under pressure into the turbine.

The preload chamber 29 is constructed to communicate with the outside of the nozzle diaphragm inner ring 22 through a steam passageway 46 so that the steam St circulating through the outside of the nozzle diaphragm inner ring 22 will flow into the preload chamber 29. The pressure head 30, when pressurized by the steam St, will be forced inward by the steam pressure to move in the axial direction of the rotor 18.

The sealing base plate 25 is mounted at an inner peripheral end of the pressure head 30. A guide 32 is also mounted on the pressure head 30. The guide 32 comes into contact with a guide acceptor 33 provided at an internal region of the nozzle diaphragm inner ring 22 in a protruding state, and prevents the pressure head 30 and the sealing base plate 25 from turning and taking an unstable posture when a moment of the steam pressure is applied to both. Smooth reciprocation in the axial direction of the rotor 18 is thus attained.

The guide 32 may be formed, for example, integrally with the pressure head 30. In addition, a way to mount the sealing base plate 25 at the above end of the pressure head 30 is not limited; for example, screws not shown may be used to fix the sealing base plate 25 to the pressure head 30.

The pressure head 30, guide 32, and sealing base plate 25 included constitute a movable region.

When the pressure head 30 is being supported at a position on a side opposite to the steam pressure-loading direction by the urging force of the return spring 31, the sealing base plate 25 lies at the position on the side opposite to the steam pressure-loading direction.

The labyrinth sealing device 23 in the present embodiment includes the preload chamber 29, the steam passageway 46, the pressure head 30, the guide 32, and the return spring 31, in addition to the sealing base plate 25.

A sealing structure that includes the labyrinth sealing device 23 and the free-cutting spacers 28 on the sealing base plate 25 is built into the steam turbine 3.

Upon the flow of the boiler-generated steam St into the steam turbine 3, as the steam St passes between one stationary blade 21 and one moving blade 17, part of the steam St circulates through the steam passageway 46 and flows into the preload chamber 29.

If the pressure of the steam St flowing into the preload chamber 29, that is, the force that moves the pressure head 30, is smaller than the urging force of the return spring 31, the return spring 31 is supporting the pressure head 30 at the position on the side opposite to the steam pressure-loading direction.

For example, if the load connected to the steam turbine 3 (see FIG. 1) increases and thus the pressure of the steam St flowing into the steam turbine 3 increases, the pressure of the steam St flowing into the preload chamber 29 also increases. After this, when the force that moves the pressure head 30 in the axial direction of the rotor 18, that is, the pressure of the steam St, increases above the urging force of the return spring 31, the steam pressure moves the pressure head 30 in the axial direction of the rotor 18. Also, the sealing base plate 25 connected to the pressure head 30 moves in an axial direction of steam pressure loading.

If the turbine is constructed so that after the pressure head 30 has moved to an axial stopping position in the steam pressure loading direction, the surfaces of the free-cutting spacers 28 on the sealing base plate 25 that are not in contact become opposed to the sealing fins 24 on the rotor 18, clearances between the sealing fins 24 and free-cutting spacers 28 that face each other can be initialized when the pressure of the steam St flowing into the preload chamber 29 increases. The initialization minimizes the clearances between the sealing fins 24 and the free-cutting spacers 28, improving sealing performance between the stationary blades 21 and the rotor 18.

Since the steam St circulating in the steam turbine 3 decreases in pressure while expanding downstream from an upstream side of the steam, the labyrinth sealing device 23 of each stationary blade 21 may be constructed so that the return springs 31 at more downstream positions in the flow direction of the steam St have a smaller urging force.

In the steam turbine 3 with the thus-constructed sealing structure built therein, during a start of turbine operation at low steam pressure, relative positions of the free-cutting spacers 28 on the sealing base plate 25 with respect to those of the sealing fins 24 on the rotor 18 are in a direction opposite to the steam pressure-loading direction.

In the thermally unstable starting state, therefore, the relative positions of the free-cutting spacers 28 on the sealing base plate 25 with respect to those of the sealing fins 24 on the rotor 18 are in the direction opposite to the steam pressure-loading direction. At this position, contact between the sealing fins 24 and the free-cutting spacers 28 often arises from thermal deformation.

If this is the case, although the free-cutting spacers 28 become recessed by contact, no damage is caused to the sealing fins 24 because of contact with the spacers 28.

When an increase in the load of the steam turbine 3 increases the pressure of the steam St, the free-cutting spacers 28 move to the axial stopping position of steam pressure loading. The movement dimensionally minimizes the clearances between the sealing fins 24 and the free-cutting spacers 28, thus improving sealing performance between the stationary blades 21 and the rotor 18. Therefore, the efficiency of the steam turbine 3 improves.

Another possible way to use the load of the steam turbine 3 would be by dividing the sealing base plate 25 that constitutes part of the labyrinth sealing device, in the peripheral direction of the sealing base plate, and constructing the sealing base plate so that the base plate can be moved radially with respect to the rotor. That is to say, the sealing base plate is constructed so that under the thermally unstable starting state, the urging force of the spring is used to press the sealing base plate into a position that the base plate moves away in its radial direction from the rotor, and so that when the increase in the load of the steam turbine 3 increases the pressure of the steam St, the loading pressure of the steam St moves the sealing base plate to a position proximate to the rotor. Thus, in the thermally unstable starting state, the sealing base plate is moved away from the rotor to prevent contact with the rotor, and when the pressure of the steam St increases, the base plate moves to a position close to the rotor to minimize the amount of leakage from the clearances at the seals.

In this construction, however, if the sealing base plate moves too much in the radial direction, the base plate opens too widely at its peripheral dividing face and a great amount of steam leaks, which then leads to insufficient steam pressure loading. It is necessary, therefore, that a radial moving distance of the sealing base plate be limited.

Referring to the above-described thermal deformation of the casing and the diaphragm, the formation level may increase. In this case, contact with the rotor will occur and any free-cutting spacers mounted at the positions opposed to the fins will be abraded. For this reason, even if the pressure of the steam St increases and the sealing base plate moves to a position close to the rotor, since the free-cutting spacers at the positions opposed to the fins will have been recessed by abrasion, the clearances above distal ends of the fins will eventually be dimensionally too large to reduce the amount of leakage.

In the present invention, since there are no problematic limitations on axial moving distances of the pressure head 30 and sealing base plate 25, any significant differences of 1 cm or more in elongation between the rotor and the casing can be easily accommodated.

A replacement for the free-cutting spacers 28 can be those using a gas-permeable metal. This gas-permeable metal is a porous metallic material having a structure with a concatenation of spatial portions (pores) in the material to enable a gas (steam St) to flow through. The gas-permeable metal, because of its excellent workability, can be used to construct free-cutting spacers 28. Using free-cutting spacers 28 formed from the gas-permeable metal is contributory to not only avoiding damage to the sealing fins 24, but also removing contact heat caused by contact between the sealing fins 24 and the free-cutting spacers 28, and preventing thermal deformation due to the contact heat.

The above has described an example of a configuration with the free-cutting spacers 28 mounted on the labyrinth sealing device 23, and an example of a configuration in which the sealing base plate 25 forming part of the sealing device 23 is mounted close to the nozzle diaphragm inner ring 22 so as to be movable in an axial direction with respect to the rotor 18. However, these examples do not limit a configuration of the present invention.

(Second Embodiment)

Figure 5:
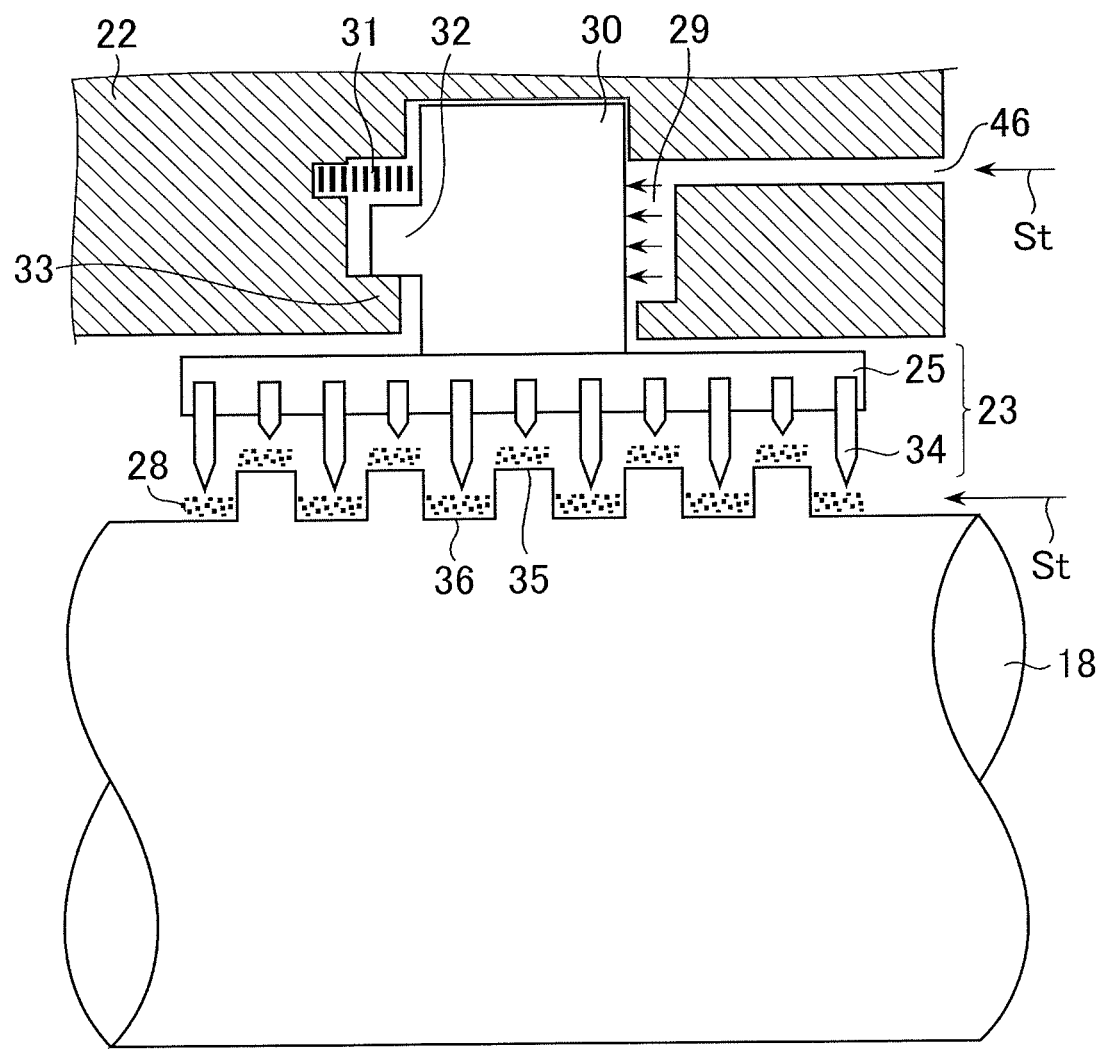
FIG. 5 is an enlarged view of a labyrinth sealing device according to another embodiment of the present invention.

For example, the labyrinth sealing device 23 can be of a high-low type shown in FIG. 5, in addition to the shape shown in FIG. 3. The present invention can also be applied to the high-low type of labyrinth sealing device shown in FIG. 5.

In the present embodiment that FIG. 5 shows, free-cutting spacers 28 formed from a free-cutting metal are mounted between sealing fins 34 on a sealing base plate 25, and high portions 35 and low portions 36 of a rotor 18, as shown.

In addition, the sealing base plate 25 with the sealing fins 34 is mounted to be movable in an axial direction of the rotor 18.

Figure 6A:
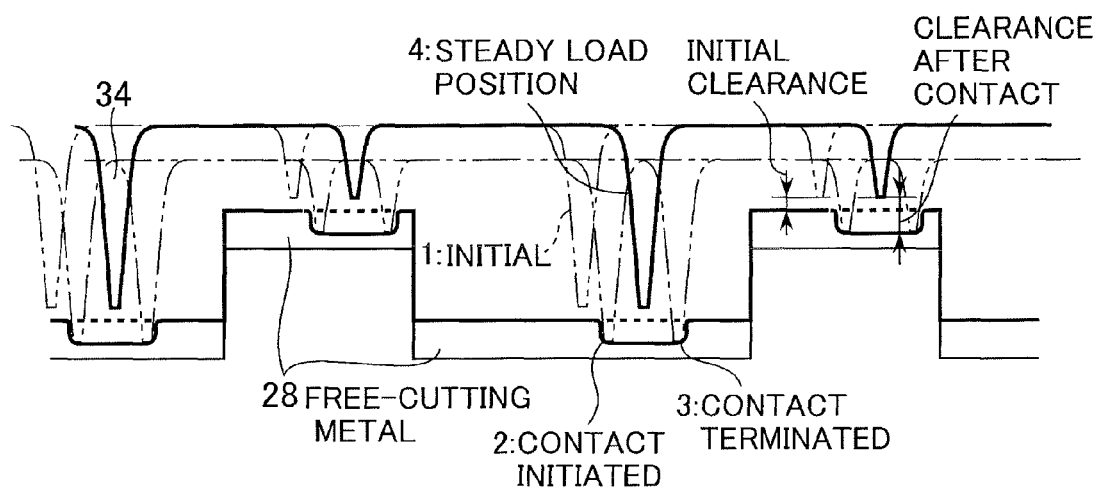
FIGS. 6A and 6B are diagrams that illustrate differences in effectiveness between another conventional labyrinth sealing device and the labyrinth sealing device shown in FIG. 5.
Figure 6B:
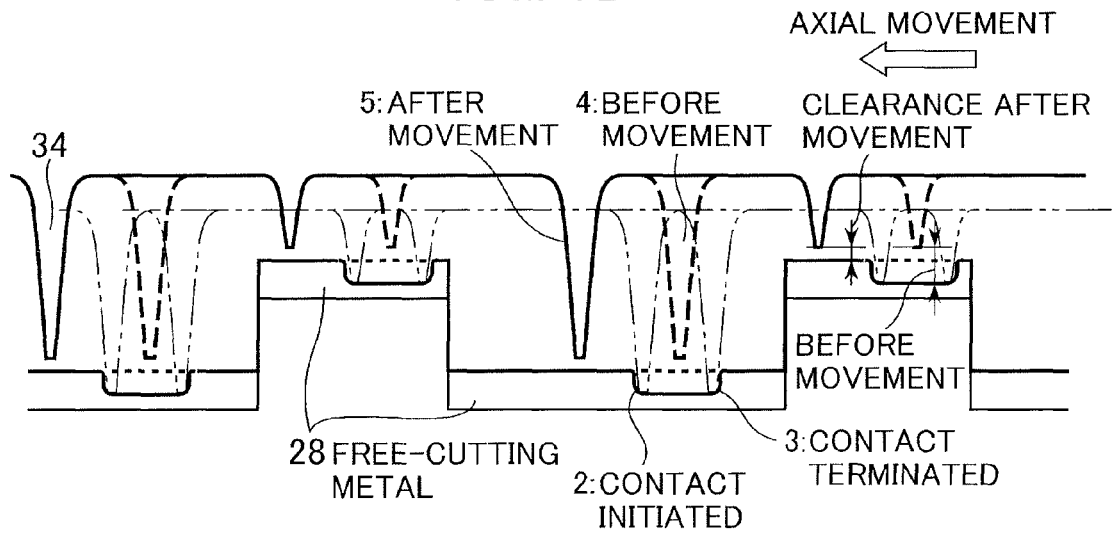

The free-cutting metal that forms each free-cutting spacer 28 in the present invention is a highly workable (abradable) material. For example, if distal ends of the sealing fins 34 on the sealing base plate 25 and the free-cutting spacers 28 on the rotor 18 come into contact during rotor rotation, only the free-cutting spacers 28 are abraded and the sealing fins 34 remain undamaged. This state is shown in FIG. 6B.

In order to facilitate understanding of the present example, conventional technology and a problem associated therewith are described below using the accompanying drawings.

In a conventional technique that uses spacers formed from a highly workable material such as an abradable material, contact between the free-cutting spacers 28 and sealing fins 34 abrades the free-cutting spacers 28 and generates clearances larger than preset ones, above the sealing fins 34. This state is shown in FIG. 6A. If the clearances are dimensionally increased by such contact, since the amount of leakage steam at the seals will increase according to the particular dimensional increases in the clearances, the increase in the amount of leakage steam will cause a problem of a decrease in steam turbine efficiency.

As discussed in the description of the first embodiment, the conventional technique causes the following problem. Contact between the free-cutting spacers 28 and the sealing fins 34 is estimated to occur through four process steps: (1) under an initial state of turbine assembly, a small amount of steam flows into the steam turbine, (2) the free-cutting spacers 28 and the sealing fins 34 initiate contact for reasons such as thermal deformation of the diaphragm, thermal deformation of the casing, or thermal elongation of the rotor, (3) then terminate contact after thermally stabilizing over time, and (4) reach a steady load position. Thermal stability is obtained and the high-temperature high-pressure steam St is introduced into the steam turbine to enable steady operation for stable power generation. The clearances in this case will have their magnitude significantly increased relative to that of the clearances existing during the initial state (1) of turbine assembly.

A consequential increase in the amount of leakage at the seals during steady operation will result in reduced turbine efficiency. This is the problem associated with the conventional technique. Focus will be returned to the description of the present embodiment.

The sealing fins 34 in the present embodiment are constructed to be axially movable with respect to the rotor 18. As shown in FIG. 6B, for example, upon the high-temperature high-pressure steam St being introduced into the steam turbine to implement steady operation after thermal stability has been reached and contact terminated, the sealing fins 34 move axially with respect to the free-cutting spacers 28 on the rotor 18, the rotating region. The free-cutting spacers 28 at the positions opposed to those of the sealing fins 34 existing after the movement, are maintained in a non-contact state. The clearances above the sealing fins 34, therefore, remain nearly equal to those existing under the initial state of the turbine. In other words, even if the free-cutting spacers 28 have their surfaces abraded by contact, since the clearances above the seals during steady operation are left dimensionally equal to initial ones, high turbine efficiency is maintained because of no increase in leakage.

Since the sealing base plate 25 with the sealing fins 34 is mounted to be movable in the axial direction of the rotor 18, even if the sealing fins 34 and the free-cutting spacers 28 come into contact, this causes no such decrease in turbine efficiency, which arises from an increase in leakage from the seals during steady operation. This develops an excellent effect in that even if the surfaces of the free-cutting spacers 28 are abraded by contact, high turbine efficiency is maintained without an increase in leakage.

Additionally, the sealing base plate 25 in the present embodiment is mounted so as to be movable in the axial direction of the rotor 18. As shown in FIG. 5, a nozzle diaphragm inner ring 22 includes a hollow preload chamber 29 in which a pressure head 30 is equipped to reciprocate in the axial direction of the rotor 18, with respect to the rotor. The pressure head 30, resiliently supported by a return spring 31, is urged by the return spring 31 with a considerable urging force acting in a direction opposite to that in which the steam is forced under pressure into the turbine.

The preload chamber 29 is constructed to communicate with the outside of the nozzle diaphragm inner ring 22 through a steam passageway 46 so that the steam St circulating through the outside of the nozzle diaphragm inner ring 22 will flow into the preload chamber 29. The pressure head 30, when pressurized by the steam St, will be forced inward by the steam pressure to move in the axial direction of the rotor 18.

The sealing base plate 25 is mounted at an inner peripheral end of the pressure head 30. A guide 32 is also mounted on the pressure head 30. The guide 32 comes into contact with a guide acceptor 33 provided at an internal region of the nozzle diaphragm inner ring 22 in a protruding state, and prevents the pressure head 30 and the sealing base plate 25 from turning and taking an unstable posture when a moment of the steam pressure is applied to both. Smooth reciprocation in the axial direction of the rotor 18 is thus attained.

The pressure head 30, guide 32, and sealing base plate 25 included constitute a movable region.

When the pressure head 30 is being supported at a position on a side opposite to the steam pressure-loading direction by the urging force of the return spring 31, the sealing base plate 25 lies at the position on the side opposite to the steam pressure-loading direction.

The labyrinth sealing device 23 in the present embodiment includes the preload chamber 29, the steam passageway 46, the pressure head 30, the guide 32, and the return spring 31, in addition to the sealing base plate 25.

A sealing structure that includes the labyrinth sealing device 23 and the free-cutting spacers 28 on the rotor 18 is built into the steam turbine 3.

Upon a flow of boiler-generated steam St into the steam turbine 3, as the steam St passes between one stationary blade 21 and one moving blade 17, part of the steam St circulates through the steam passageway 46 and flows into the preload chamber 29.

If the pressure of the steam St flowing into the preload chamber 29, that is, force that moves the pressure head 30, is smaller than the urging force of the return spring 31, the return spring 31 is supporting the pressure head 30 at the position on the side opposite to the steam pressure-loading direction.

For example, if the load connected to the steam turbine 3 increases and thus the pressure of the steam St flowing into the steam turbine 3 increases, the pressure of the steam St flowing into the preload chamber 29 also increases. After this, when the force that moves the pressure head 30 in the axial direction of the rotor 18, that is, the pressure of the steam St, increases above the urging force of the return spring 31, the steam pressure moves the pressure head 30 in the axial direction of the rotor 18. Also, the sealing base plate 25 connected to the pressure head 30 moves in an axial direction of steam pressure loading.

If the turbine is constructed so that after the pressure head 30 has moved to a stopping position of steam pressure loading, the surfaces of the free-cutting spacers 28 on the rotor 18 that are not in contact become opposed to the surfaces of the sealing fins 34 on the sealing base plate 25, clearances between the sealing fins 34 and free-cutting spacers 28 that face each other can be initialized when the pressure of the steam St flowing into the preload chamber 29 increases. The initialization minimizes the clearances between the sealing fins 34 and the free-cutting spacers 28, improving sealing performance between the stationary blades 21 and the rotor 18.

Since the steam St circulating in the steam turbine 3 decreases in pressure while expanding downstream from an upstream side of the steam, the labyrinth sealing device 23 of each stationary blade 21 may be constructed so that the return springs 31 at more downstream positions in the flow direction of the steam St have a smaller urging force.

In the steam turbine 3 with the thus-constructed sealing structure built therein, during a start of turbine operation at low steam pressure, relative positions of the sealing fins 34 on the sealing base plate 25 with respect to those of the free-cutting spacers 28 on the rotor 18 are in a direction opposite to the steam pressure-loading direction.

In the thermally unstable starting state, therefore, the relative positions of the sealing fins 34 on the sealing base plate 25 with respect to those of the free-cutting spacers 28 on the rotor 18 are in the direction opposite to the steam pressure-loading direction. At this position, contact between the sealing fins 34 and the free-cutting spacers 28 often arises from thermal deformation.

In this case, although the free-cutting spacers 28 become recessed by contact, no damage is caused to the sealing fins 34 because of contact with the spacers 28.

When an increase in the load of the steam turbine 3 increases the pressure of the steam St, the sealing fins 34 move to the axial stopping position of steam pressure loading. The movement dimensionally minimizes the clearances between the sealing fins 34 and the free-cutting spacers 28, thus improving sealing performance between the stationary blades 21 and the rotor 18. Therefore, the efficiency of the steam turbine 3 improves.

A replacement for the free-cutting spacers 28 can be those using a gas-permeable metal. Since the gas-permeable metal is a highly workable material, this metal can be used to construct free-cutting spacers 28. Using free-cutting spacers 28 formed from the gas-permeable metal is contributory to not only avoiding damage to the sealing fins 34, but also removing contact heat caused by contact between the sealing fins 34 and the free-cutting spacers 28, and preventing thermal deformation due to the contact heat.

The above has described an example of a configuration with the free-cutting spacers 28 mounted on the rotor 18, and an example of a configuration in which the sealing base plate 25 forming part of the sealing device 23 is mounted close to the nozzle diaphragm inner ring 22 so as to be movable in an axial direction with respect to the rotor 18. However, these examples do not limit a configuration of the present invention.

(Third Embodiment)

Figure 7:
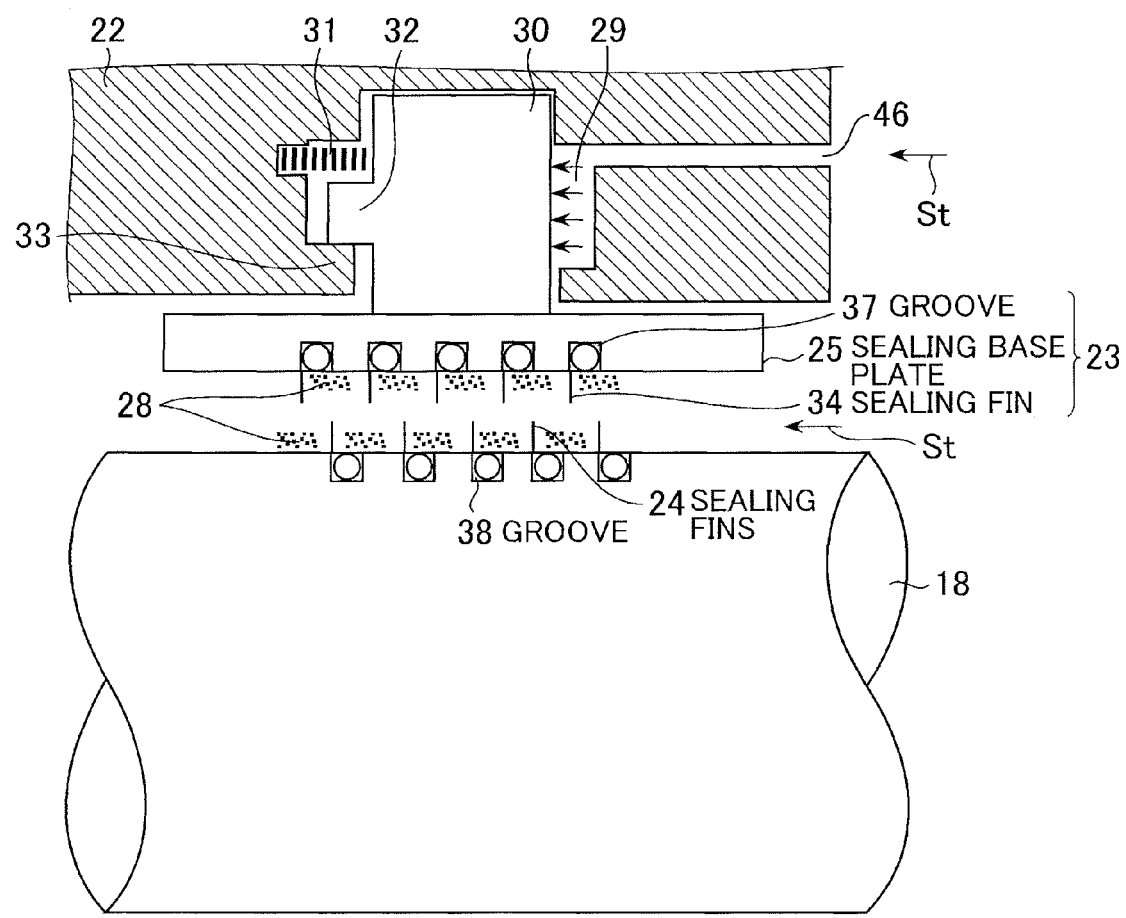
FIG. 7 is an enlarged view of a labyrinth sealing device according to yet another embodiment of the present invention.

For example, the labyrinth sealing device 23 can be of a stagger type shown in FIG. 7, in addition to the shapes shown in FIGS. 3, 5. The present invention can also be applied to the stagger type of labyrinth sealing device shown in FIG. 7.

As shown in FIG. 7, a nozzle diaphragm inner ring 22 according to the present embodiment includes a sealing base plate 25 having a plurality of sealing fins 34.

The sealing base plate 25 is provided with a plurality of grooves 37 lined up at equal intervals in an axial direction of a rotor 18 and formed in a circumferential direction of the rotor, and one sealing fin 34 is fixed to each of the grooves 37 by caulking.

The rotor 18 is also provided with a plurality of grooves 38 lined up at equal intervals in the axial direction of the rotor 18 and formed in a circumferential direction of the rotor, and one sealing fin 24 is fixed to each of the grooves 38 by caulking.

The sealing fins 34 on the sealing base plate 25 and the sealing fins 24 on the rotor 18 are arranged so as to overlap in an alternate fashion in the axial direction of the rotor 18.

In this way, a labyrinth sealing device 23 is constructed, which includes the sealing base plate 25 having the plurality of sealing fins 34.

Free-cutting spacers 28 formed from a free-cutting metal are mounted between the rotor 18 and the sealing fins 34 on the sealing base plate 25, and between the sealing base plate 25 and the sealing fins 24 on the rotor 18, as shown.

In addition, the sealing base plate 25 with the sealing fins 34 and the free-cutting spacers 28 is mounted to be movable in the axial direction of the rotor 18.

All or at least part of the effects described in the embodiments shown in FIGS. 3, 5 can be obtained by adopting the above construction.

That is to say, the labyrinth sealing device 23 in the present embodiment includes the preload chamber 29, the steam passageway 46, the pressure head 30, the guide 32, and the return spring 31, in addition to the sealing base plate 25.

A sealing structure that includes the labyrinth sealing device 23 and the free-cutting spacers 28 on the rotor 18 is built into the steam turbine 3 (see FIG. 1).

Upon boiler-generated steam St flowing into the steam turbine 3, as the steam St passes between one stationary blade 21 and one moving blade 17, part of the steam St circulates through the steam passageway 46 and flows into the preload chamber 29.

If the pressure of the steam St flowing into the preload chamber 29, that is, force that moves the pressure head 30, is smaller than the urging force of the return spring 31, the return spring 31 is supporting the pressure head 30 at a position on a side opposite to the steam pressure-loading direction.

For example, if the load connected to the steam turbine 3 increases and thus the pressure of the steam St flowing into the steam turbine 3 increases, the pressure of the steam St flowing into the preload chamber 29 also increases.

After this, when the force that moves the pressure head 30 in the axial direction of the rotor 18, that is, the pressure of the steam St, increases above the urging force of the return spring 31, the steam pressure moves the pressure head 30 in the axial direction of the rotor 18. Also, the sealing base plate 25 connected to the pressure head 30 moves in an axial direction of steam pressure loading.

At this position, contact between the sealing fins 34 on the sealing base plate 25 and the free-cutting spacers 28 on the rotor 18 can arise, and contact between the sealing fins 24 and the free-cutting spacers 28 opposed to the sealing fins 24 on the rotor 18 can arise from thermal deformation.

If this actually happens, although the free-cutting spacers 28 become recessed by contact, no damage is caused to the sealing fins 34 or 24 because of contact with the spacers 28.

After the steam turbine 3 has become thermally stable, the pressure of the steam St is increased to increase the load of the turbine 3. If the turbine is constructed so that after the pressure head 30 has moved to a stopping position of steam pressure loading, not only the surfaces of the free-cutting spacers 28 on the rotor 18 that are not in contact become opposed to the surfaces of the sealing fins 34 on the sealing base plate 25, but also the surfaces of the free-cutting spacers 28 on the sealing base plate 25 that are not in contact become opposed to the surfaces of the sealing fins 24 on the rotor 18. Clearances between the sealing fins 34, 24 and free-cutting spacers 28 that face each other can then be initialized when the pressure of the steam St flowing into the preload chamber 29 increases. The initialization minimizes the clearances between the sealing fins 24, 34 and the free-cutting spacers 28, improving sealing performance between the stationary blades 21 and the rotor 18.

A replacement for the free-cutting spacers 28 can be those using a gas-permeable metal. Since the gas-permeable metal is a highly workable material, this metal can be used to construct free-cutting spacers 28. Using free-cutting spacers 28 formed from the gas-permeable metal is contributory to not only avoiding damage to the sealing fins 34, 24 but also removing contact heat caused by contact between the sealing fins 34, 24 and the free-cutting spacers 28, and preventing thermal deformation due to the contact heat.

(Fourth Embodiment)

The present embodiment can also be applied to a labyrinth sealing device provided between a nozzle diaphragm outer ring 20 (see FIG. 2) and a moving blade 17 (also, see FIG. 2).

Figure 8:
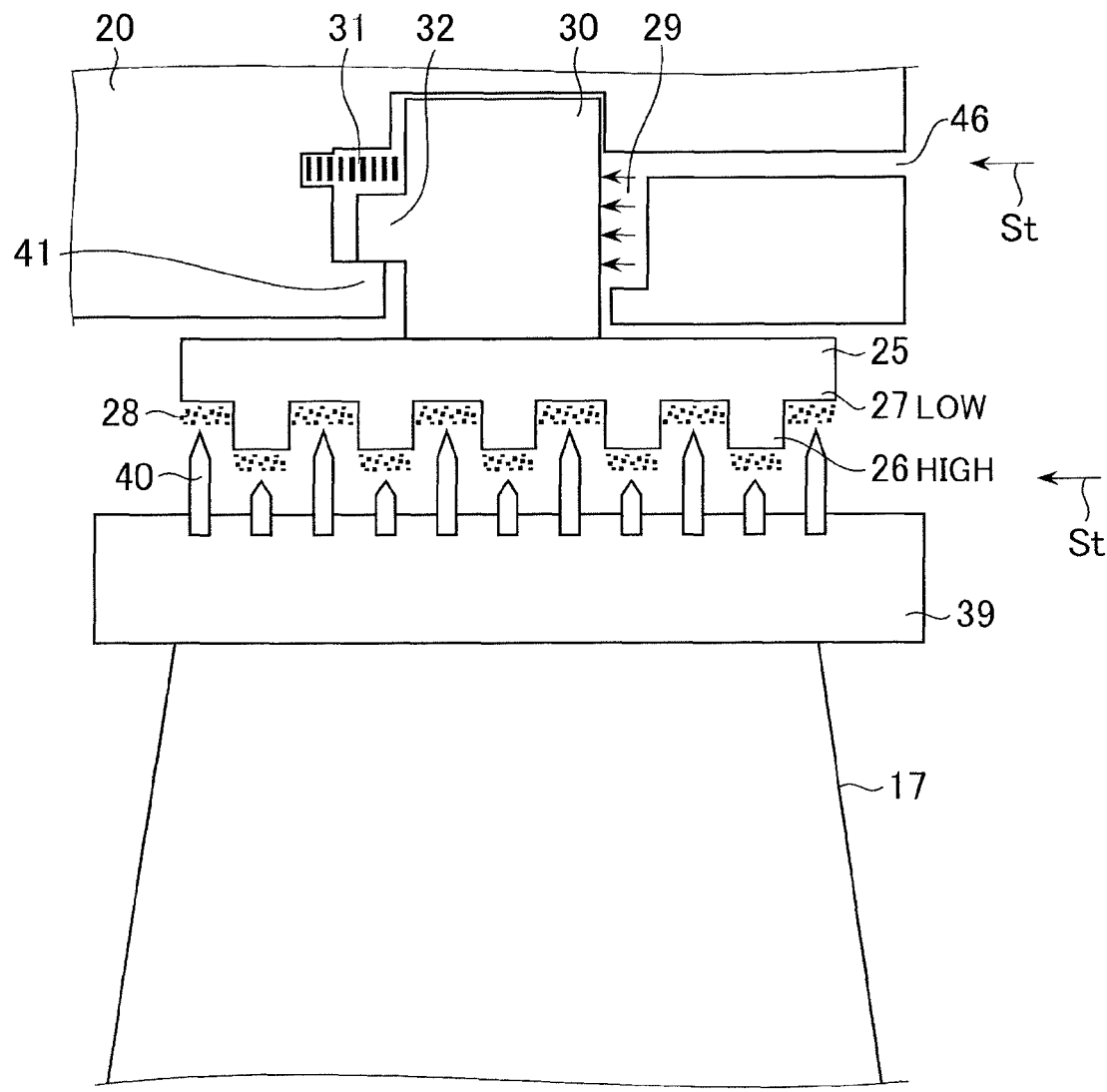
FIG. 8 is a schematic that shows a distal end of a moving blade used in a further embodiment.

As shown in FIG. 8, a sealing base plate 25 of a high-low type, for example, is used, and a plurality of high portions 26 and low portions 27, each shaped along a rotational axis, or periphery, of one moving blade 17, and lined up in an axial direction of a rotor 18, are formed on the sealing base plate 25.

A free-cutting spacer 28 shaped in a peripheral direction is mounted on each of the high portions 26 and low portions 27.

Free-cutting spacers 28 provided in a casing 19 (see FIG. 2) that is part of a fixed region are each constructed to be movable in the axial direction of the rotor with respect to the moving blades that are part of a stationary region.

In addition, on a cover 39 of each moving blade 17, a plurality of sealing fins 40 are arranged substantially upright in a peripheral direction, at positions opposed to the high portions 26 and low portions 27 of the sealing base plate 25.

A preload chamber 29 is formed in the nozzle diaphragm outer ring 20, and a pressure head 30 that reciprocates in the axial direction of the rotor 18 with respect to the moving blade 17 is equipped inside the preload chamber 29. The pressure head 30, resiliently supported by a return spring 31, is urged by the return spring 31 to act in a direction opposite to a steam pressure loading direction.

The preload chamber 29 is constructed to communicate with the outside of the nozzle diaphragm outer ring 20 through a steam passageway 46 so that the steam St circulating through the outside of the nozzle diaphragm outer ring 20 will flow into the preload chamber 29. The pressure head 30, when pressurized by the steam St, will be forced inward by the steam pressure to move in the axial direction of the rotor 18.

The sealing base plate 25 is mounted at a front end of the pressure head 30. A guide 32 is also mounted on the pressure head 30. The guide 32 comes into contact with a guide acceptor 41 provided at an internal region of the nozzle diaphragm outer ring 20 in a protruding state, and prevents the pressure head 30 and the sealing base plate 25 from turning and taking an unstable posture when a moment of the steam pressure is applied to both. Smooth reciprocation in the axial direction of the rotor is thus attained.

The guide 32 may be formed, for example, integrally with the pressure head 30. In addition, a way to mount the sealing base plate 25 at the above end of the pressure head 30 is not limited; for example, screws not shown may be used to fix the sealing base plate 25 to the pressure head 30.

The pressure head 30, guide 32, and sealing base plate 25 included constitute a movable region.

Furthermore, a labyrinth sealing device 23 is constructed that includes the sealing base plate 25, the pressure head 30, the guide 32, the return spring 31, the preload chamber 29, and the steam passageway 46.

A sealing structure that includes the labyrinth sealing device 23 and the sealing fins 40 on the moving blade 17 is built into the steam turbine 3 (see FIG. 1).

When the pressure head 30 is being supported at a position on a side opposite to the steam pressure-loading direction by the urging force of the return spring 31, the sealing base plate 25 lies at the position on the side opposite to the steam pressure-loading direction.

Upon a flow of boiler-generated steam St into the steam turbine 3 (see FIG. 1), as the steam St passes the outside of the nozzle diaphragm outer ring 20, part of the steam St circulates through the steam passageway 46 and flows into the preload chamber 29.

If the pressure of the steam St flowing into the preload chamber 29, that is, force that moves the pressure head 30 in an axial direction of steam pressure loading, is smaller than the urging force of the return spring 31, the return spring 31 is supporting the pressure head 30 at the position on the side opposite to the steam pressure-loading direction.

When the pressure head 30 is being supported by the urging force of the return spring 31 at the position on the side opposite to the steam pressure-loading direction, the sealing base plate 25 lies at the position on the side opposite to the steam pressure-loading direction. Relative positions of the free-cutting spacers 28 on the sealing base plate 25 side with respect to the positions of the sealing fins 40 on the cover 39 are in a direction opposite to the steam pressure-loading direction.

At this position, contact between the free-cutting spacers 28 on the sealing base plate 25 and the sealing fins 40 on the moving blade cover 39 that are opposed to the free-cutting spacers 28 can arise from thermal deformation.

If this actually happens, although the free-cutting spacers 28 become recessed by contact, no damage is caused to the sealing fins 40 because of contact with the spacers 28.

An increase in the pressure of the steam St flowing into the steam turbine 3 (see FIG. 3) also increases the pressure of the steam St flowing into the preload chamber 29. After this, when the loading pressure with which the steam St moves the pressure head 30 in the axial direction of steam pressure loading increases above the urging force of the return spring 31, the pressure of the steam St moves the pressure head 30 in the axial direction and the sealing base plate 25 connected to the pressure head 30 moves in the axial direction of steam pressure loading.

If the turbine is constructed so that after the steam pressure has increased and the pressure head 30 has moved to a stopping position of steam pressure loading, the surfaces of the free-cutting spacers 28 on the sealing base plate 25 that are not in contact become opposed to the surfaces of the sealing fins 40 on the cover 39 of the moving blade 17, clearances between the sealing fins 40 and free-cutting spacers 28 that face each other can then be initialized when the pressure of the steam St flowing into the preload chamber 29 increases.

The initialization minimizes the clearances between the cover 39 of the moving blade 17 and the sealing base plate 25, improving sealing performance between the nozzle diaphragm outer ring 20 and the moving blade 17.

Thus, steam turbine efficiency improves.

Since the steam St circulating in the steam turbine 3 (see FIG. 1) decreases in pressure while expanding downstream from an upstream side of the steam, the labyrinth sealing device 23 may be constructed so that as shown in FIG. 3, the return springs 31 at more downstream positions in the flow direction of the steam St have a smaller urging force.

While the labyrinth sealing device 23 shown in FIG. 8 is constructed for the free-cutting spacers 28 to be mounted on the sealing base plate 25 and for the sealing fins 40 to be mounted on the cover 39, the sealing device may have sealing fins 40 on the sealing base plate 25 and free-cutting spacers 28 on the cover 39.

Alternatively, sealing fins may be mounted on both of the sealing base plate 25 and the cover 39. In this case, free-cutting spacers 28 will be mounted at the positions of the sealing base plate 25 that face the sealing fins on the cover 39, as well as at the positions of the cover 39 that face the sealing fins on the sealing base plate 25.

While embodiments of the present invention have been described above, the invention is not limited to the embodiments and may be appropriately redesigned without departing from the scope of the invention.

(Fifth Embodiment)

Figure 9:
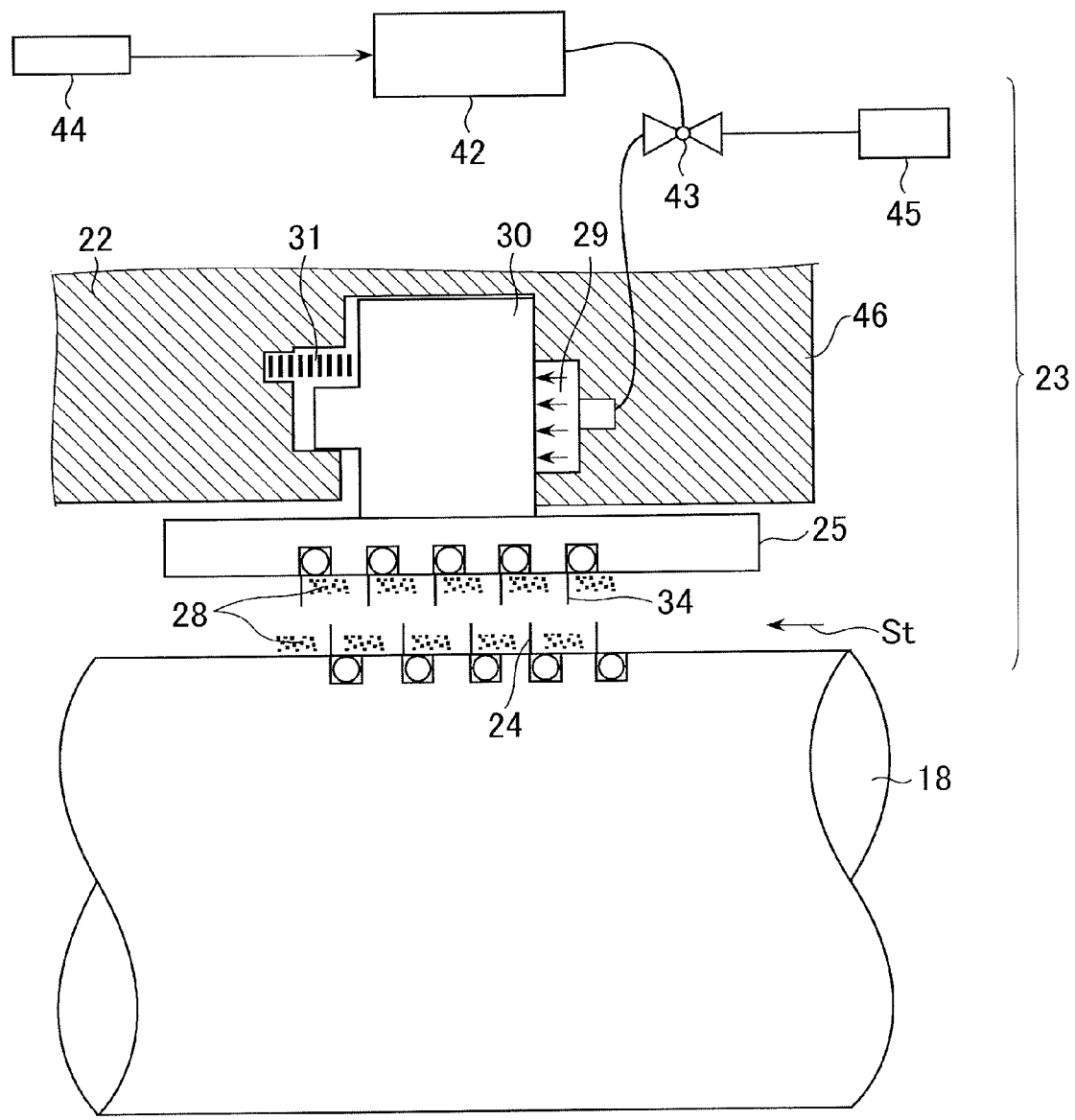
FIG. 9 is a schematic that shows an example of a further labyrinth sealing device configuration that introduces driving steam from a high-pressure steam supply into a preload chamber and moves a pressure head.

The pressure head 30 in the labyrinth sealing device 23 shown in FIG. 7 is driven by the pressure of the steam St flowing through the steam turbine 3, but as shown in FIG. 9, for example, a pressure of steam flowing from a high-pressure steam supply 45 into the preload chamber 29 to drive the pressure head 30 may be used to drive the pressure head 30 in an axial direction of steam loading.

A labyrinth sealing device 23 shown in FIG. 9 includes a preload 29, a pressure head 30, for example a return spring 31, a sealing base plate 25, a valve control device 42, an operational state detector 44, a high-pressure steam supply 45, and an electromagnetic valve 43.

The sealing base plate 25 is substantially of the same configuration as that of the sealing base plate 25 of the labyrinth sealing device 23 shown in FIG. 7.

A sealing structure that includes, in addition to the labyrinth sealing device 23, sealing fins 24, 34 and free-cutting spacers 28 that are provided both on a rotor side and on the sealing base plate 25, is built into a steam turbine 3.

The high-pressure steam supply 45 is connected to the preload chamber 29 via the electromagnetic valve 43. The valve control device 42 that controls open/close actions of the electromagnetic valve 43 is also connected.

The valve control device 42 is suitably constructed to control the opening or closing of the electromagnetic valve 43, depending on an operational state of the steam turbine 3, and for this purpose, the operational state detector 44 is provided to detect the operational state of the steam turbine 3.

In this configuration, the valve control device 42 can move a movable region, inclusive of the pressure head 30 and the sealing base plate 25, in an axial direction of the rotor 18 according to the particular operational state of the steam turbine 3. Steam temperature, vibration of the rotor 18, and other factors, as well as steam pressure, can be used to discriminate operational states that become unstable in case of thermal deformation of a casing, thermal deformation of a diaphragm, or other events. Not only thermal deformation levels of the casing and diaphragm, but also a differential level of thermal elongation that is derived by subtracting an axial thermal elongation level of the casing from that of the rotor can be used to discriminate the operational states that become unstable.

A driving unit is constructed that includes the reload chamber 29, the valve control device 42, the high-pressure steam supply 45, and the electromagnetic valve 43.

The operational state of the steam turbine 3 at a particular time is suitably detected from the vibration level of the steam turbine rotor 18, the steam temperature and/or steam pressure of the steam turbine 3, and/or the differential level of thermal elongation that is derived by subtracting the axial thermal elongation level of the casing from that of the rotor. State detection is described for each kind of parameter.

First Example

It is preferable that the operational state of the steam turbine 3 be detected from the vibration level of its rotor 18. The operational state detector 44 operates as a rotor vibration detector to detect the steam turbine rotor vibration (vibration amplitude, vibration phase, or both thereof).

The operational state detector 44 that is the rotor vibration detector detects the vibration (vibration amplitude, vibration phase, or both thereof) of the steam turbine rotor 18, converts the detected vibration level into a detection signal, and inputs the signal to the valve control device 42.

The valve control device 42 calculates the rotor vibration from the detection signal input from the operational state detector 44, the rotor vibration detector.

When the calculated rotor vibration level is equal to or higher than a preset rotor vibration level, the valve control device 42 transmits a control signal to the electromagnetic valve 43 to close this electromagnetic valve.

The preset rotor vibration level is desirably an appropriate value determined from steam turbine performance characteristics or the like.

In accordance with the control signal received from the valve control device 42, the electromagnetic valve 43 closes to cut off the flow of the driving steam from the high-pressure steam supply 45 into the preload chamber 29.

When no driving steam is flowing into the preload chamber 29, the urging force of the return spring 31 moves the pressure head 30 in the direction opposite to the steam pressure loading direction.

Upon the pressure head 30 moving in the direction opposite to the steam pressure loading direction, the sealing base plate 25 also moves in the direction opposite to the steam pressure loading direction. At this position, contact between the sealing fins 34 on the sealing base plate 25 and the free-cutting spacers 28 on the rotor 18 can arise, and contact between the sealing fins 24 and the free-cutting spacers 28 opposed to the sealing fins 24 on the rotor 18 can arise from thermal deformation.

If this actually happens, although the free-cutting spacers 28 become recessed by contact, no damage is caused to the sealing fins 34 or 24 because of contact with the spacers 28.

When the calculated rotor vibration level is lower than the preset rotor vibration level, the valve control device 42 transmits a control signal to the electromagnetic valve 43 to open this electromagnetic valve.

In accordance with the control signal received from the valve control device 42, the electromagnetic valve 43 opens to cause the driving steam to flow from the high-pressure steam supply 45 into the preload chamber 29.

The pressure of the driving steam flowing from the high-pressure steam supply 45 into the preload chamber 29 moves the pressure head 30 in the axial steam-pressure loading direction.

The turbine may be constructed so that after the movement of the pressure head 30 in the axial steam-pressure loading direction has also caused the sealing base plate 25 to move in the axial steam-pressure loading direction and the pressure head 30 to move to a stopping position of steam pressure loading, not only the surfaces of the free-cutting spacers 28 on the rotor 18 that are not in contact will become opposed to the surfaces of the sealing fins 34 on the sealing base plate 25, but also will the surfaces of the free-cutting spacers 28 on the sealing base plate 25 that are not in contact become opposed to the surfaces of the sealing fins 24 on the rotor 18. Clearances between the sealing fins 34 and the free-cutting spacers 28 facing the sealing fins 24 can then be initialized when the pressure of the steam St flowing into the preload chamber 29 increases. The initialization will minimize the clearances between the sealing fins 34, 24 and the free-cutting spacers 28 that face each other, and improve sealing performance between the stationary blade 21 and the rotor 18.

Second Example

It is preferable that the operational state of the steam turbine 3 be detected from the steam temperature of the steam turbine 3. The operational state detector 44 operates as a steam temperature detector to detect the steam temperature of the steam turbine 3.

The operational state detector 44 as the steam temperature detector, detects the steam temperature of the steam turbine 3, converts the detected steam temperature into a detection signal, and inputs the signal to the valve control device 42.

The valve control device 42 calculates the steam temperature from the detection signal input from the operational state detector 44, the steam temperature detector.

When the calculated steam temperature is lower than a preset steam temperature, the valve control device 42 transmits a control signal to the electromagnetic valve 43 to close this electromagnetic valve.

The preset steam temperature is desirably an appropriate value determined from steam turbine performance characteristics or the like.

In accordance with the control signal received from the valve control device 42, the electromagnetic valve 43 closes to cut off the flow of the driving steam from the high-pressure steam supply 45 into the preload chamber 29.

When no driving steam is flowing into the preload chamber 29, the urging force of the return spring 31 moves the pressure head 30 in the direction opposite to the steam pressure loading direction.

Upon the pressure head 30 moving in the direction opposite to the steam pressure loading direction, the sealing base plate 25 also moves in the direction opposite to the steam pressure loading direction. At this position, contact between the sealing fins 34 on the sealing base plate 25 and the free-cutting spacers 28 on the rotor 18 can arise, and contact between the sealing fins 24 and the free-cutting spacers 28 opposed to the sealing fins 24 on the rotor 18 can arise from thermal deformation.

If this actually happens, although the free-cutting spacers 28 become recessed by contact, no damage is caused to the sealing fins 34 or 24 because of contact with the spacers 28.

When the calculated steam temperature is equal to or higher than the preset steam temperature, the valve control device 42 transmits a control signal to the electromagnetic valve 43 to open this electromagnetic valve.

In accordance with the control signal received from the valve control device 42, the electromagnetic valve 43 opens to cause the driving steam to flow from the high-pressure steam supply 45 into the preload chamber 29.

The pressure of the driving steam flowing from the high-pressure steam supply 45 into the preload chamber 29 moves the pressure head 30 in the axial steam-pressure loading direction.

The turbine may be constructed so that after the movement of the pressure head 30 in the axial steam-pressure loading direction has also caused the sealing base plate 25 to move in the axial steam-pressure loading direction and the pressure head 30 to move to a stopping position of steam pressure loading, not only the surfaces of the free-cutting spacers 28 on the rotor 18 that are not in contact will become opposed to the surfaces of the sealing fins 34 on the sealing base plate 25, but also will the surfaces of the free-cutting spacers 28 on the sealing base plate 25 that are not in contact become opposed to the surfaces of the sealing fins 24 on the rotor 18. Clearances between the sealing fins 34, 24 and the free-cutting spacers 28 that face each other can then be initialized when the pressure of the steam St flowing into the preload chamber 29 increases. The initialization will minimize the clearances between the sealing fins 34, 24 and the free-cutting spacers 28, and improve sealing performance between the stationary blade 21 and the rotor 18.

Third Example

The operational state of the steam turbine 3 may be detected from the pressure of the steam St, in which case the operational state detector 44 operates as a pressure detector to detect the pressure of the steam St.

The operational state detector 44 as the pressure detector, detects the pressure of the steam St circulating through the steam turbine 3, then inputs an appropriate detection signal to the valve control device 42, and causes the valve control device 42 to calculate the pressure of the steam St.

When the calculated steam pressure is lower than a preset pressure, the valve control device 42 transmits a control signal to the electromagnetic valve 43 to close this electromagnetic valve.

In accordance with the control signal received from the valve control device 42, the electromagnetic valve 43 closes to cut off the flow of the driving steam from the high-pressure steam supply 45 into the preload chamber 29.

The preset pressure value is desirably an appropriate value determined from steam turbine performance characteristics or the like.

When no driving steam is flowing into the preload chamber 29, the urging force of the return spring 31 moves the pressure head 30 in the direction opposite to the steam pressure loading direction.

Upon the pressure head 30 moving in the direction opposite to the steam pressure loading direction, the sealing base plate 25 also moves in the direction opposite to the steam pressure loading direction. At this position, contact between the sealing fins 34 on the sealing base plate 25 and the free-cutting spacers 28 on the rotor 18 can arise, and contact between the sealing fins 24 and the free-cutting spacers 28 opposed to the sealing fins 24 on the rotor 18 can arise from thermal deformation.

If this actually happens, although the free-cutting spacers 28 become recessed by contact, no damage is caused to the sealing fins 34 or 24 because of contact with the spacers 28.

When the calculated steam pressure is equal to or greater than the preset steam pressure, the valve control device 42 transmits a control signal to the electromagnetic valve 43 to open this electromagnetic valve.

In accordance with the control signal received from the valve control device 42, the electromagnetic valve 43 opens to cause the driving steam to flow from the high-pressure steam supply 45 into the preload chamber 29.

The pressure of the driving steam flowing from the high-pressure steam supply 45 into the preload chamber 29 moves the pressure head 30 in the axial steam-pressure loading direction.

The turbine may be constructed so that after the movement of the pressure head 30 in the axial steam-pressure loading direction has also caused the sealing base plate 25 to move in the axial steam-pressure loading direction and the pressure head 30 to move to a stopping position of steam pressure loading, not only the surfaces of the free-cutting spacers 28 on the rotor 18 that are not in contact will become opposed to the surfaces of the sealing fins 34 on the sealing base plate 25, but also will the surfaces of the free-cutting spacers 28 on the sealing base plate 25 that are not in contact become opposed to the surfaces of the sealing fins 24 on the rotor 18. Clearances between the sealing fins 34, 24 and the free-cutting spacers 28 that face each other can then be initialized when the pressure of the steam St flowing into the preload chamber 29 increases. The initialization will minimize the clearances between the sealing fins 34, 24 and the free-cutting spacers 28, and improve sealing performance between the stationary blade 21 and the rotor 18.

Fourth Example

The operational state of the steam turbine 3 may be detected from the differential thermal elongation level derived by subtracting the axial thermal elongation level of the casing from that of the rotor. In this case, the operational state detector 44 operates as a differential thermal elongation detector to detect the differential thermal elongation level of the steam turbine.

The operational state detector 44 as the differential thermal elongation detector, detects the differential thermal elongation level of the steam turbine 3, then inputs an appropriate detection signal to the valve control device 42, and causes the valve control device 42 to calculate the differential thermal elongation level.

When the calculated differential thermal elongation level is lower than a preset differential thermal elongation level, the valve control device 42 transmits a control signal to the electromagnetic valve 43 to close this electromagnetic valve.

In accordance with the control signal received from the valve control device 42, the electromagnetic valve 43 closes to cut off the flow of the driving steam from the high-pressure steam supply 45 into the preload chamber 29.

The preset differential thermal elongation level is desirably an appropriate value determined from steam turbine performance characteristics or the like.

When no driving steam is flowing into the preload chamber 29, the urging force of the return spring 31 moves the pressure head 30 in the direction opposite to the steam pressure loading direction.

Upon the pressure head 30 moving in the direction opposite to the steam pressure loading direction, the sealing base plate 25 also moves in the direction opposite to the steam pressure loading direction. At this position, contact between the sealing fins 34 on the sealing base plate 25 and the free-cutting spacers 28 on the rotor 18 can arise, and contact between the sealing fins 24 and the free-cutting spacers 28 opposed to the sealing fins 24 on the rotor 18 can arise from thermal deformation.

If this actually happens, although the free-cutting spacers 28 become recessed by contact, no damage is caused to the sealing fins 34 or 24 because of contact with the spacers 28.

When the calculated differential thermal elongation level is equal to or higher than the preset differential thermal elongation level, the valve control device 42 transmits a control signal to the electromagnetic valve 43 to open this electromagnetic valve.

In accordance with the control signal received from the valve control device 42, the electromagnetic valve 43 opens to cause the driving steam to flow from the high-pressure steam supply 45 into the preload chamber 29.

The pressure of the driving steam flowing from the high-pressure steam supply 45 into the preload chamber 29 moves the pressure head 30 in the axial steam-pressure loading direction.

The turbine may be constructed so that after the movement of the pressure head 30 in the axial steam-pressure loading direction has also caused the sealing base plate 25 to move in the axial steam-pressure loading direction and the pressure head 30 to move to a stopping position of steam pressure loading, not only the surfaces of the free-cutting spacers 28 on the rotor 18 that are not in contact will become opposed to the surfaces of the sealing fins 34 on the sealing base plate 25, but also will the surfaces of the free-cutting spacers 28 on the sealing base plate 25 that are not in contact become opposed to the surfaces of the sealing fins 24 on the rotor 18. Clearances between the sealing fins 34, 24 and the free-cutting spacers 28 that face each other can then be initialized when the pressure of the steam St flowing into the preload chamber 29 increases. The initialization will minimize the clearances between the sealing fins 34, 24 and the free-cutting spacers 28, and improve sealing performance between the stationary blade 21 and the rotor 18.

Examples of employing one detection item during operational state detection with the operational state detector 44 have been described in FIG. 9. However, a configuration may be adopted that detects a plurality of items at the same time. For example, during operational state detection, when the temperature and pressure of the steam are detected, only if both values are equal to or greater than the respective presettings, may the pressure head 30 be moved in the loading direction of the steam pressure. None of these configurations is discrepant from the present invention in terms of the nature and essence thereof.

The free-cutting spacers 28 can be replaced by those which use a gas-permeable metal. Using free-cutting spacers 28 formed from a gas-permeable metal is contributory to not only preventing damage to the sealing fins 34, 24, but also removing contact heat caused by contact between the sealing fins 34, 24 and the free-cutting spacers 28, and preventing thermal deformation due to the contact heat.

In addition, while the labyrinth sealing device 23 shown in FIG. 9 is constructed to move the pressure head 30 in a required direction by introducing the driving steam from the high-pressure steam supply 45 into the preload chamber 29, the sealing device may instead be constructed to move the pressure head 30 in the required direction using, for example, an actuator not shown.

Furthermore, the sealing structure built in between the nozzle diaphragm outer ring 20 and the moving blade 17 may be of the same construction as that of the sealing structure shown in FIG. 9.

As described above, in the steam turbine 3 of the present embodiment, the sealing structure that includes the labyrinth sealing device 23, the sealing fins 24 on the rotor 18, and the free-cutting spacers 28 on the sealing base plate 25, is built in between each stationary blade 21 forming part of the fixed region, and the rotor 18 forming part of the rotating region. This sealing structure is shown in FIG. 3. The sealing base plate 25 with the free-cutting spacers 28 is mounted to be movable in the axial direction of the rotor 18.

In this configuration, when the load of the steam turbine 3 increases, the pressure head 30 moves in the axial direction of steam pressure loading of the rotor 18. The sealing base plate 25 connected to the pressure head 30, also moves in the axial direction of steam pressure loading of the rotor 18. The free-cutting spacers 28 at the positions opposed to those of the sealing fins 24 existing after the axial movement, are maintained in a non-contact state. The clearances between the sealing fins 24 and the free-cutting spacers 28, therefore, are dimensionally minimized, which then improves sealing performance between each stationary blade 21 and the rotor 18. This in turn yields excellent effects in that sealing performance between each stationary blade 21 and the rotor 18 improves and in that a decrease in turbine efficiency due to steam leakage is suppressed.

Additionally, the steam turbine is constructed so that the free-cutting spacers 28 are each formed using a free-cutting metal that is an abradable material excellent in workability. This construction develops a further effect in that even if the sealing fins 34, 24 and the free-cutting spacers 28 come into contact, the sealing fins 34, 24 is prevented from being damaged since only the free-cutting spacers 28 are abraded.

The position of the sealing structure which, as shown in FIG. 3, for example, includes the labyrinth sealing device 23, the sealing fins 24, and the free-cutting spacers 28, is not limited to a position between the nozzle diaphragm inner ring 22 and the rotor 18; the sealing structure may be built in between another fixed region and the rotating region, such as between the casing 19 (see FIG. 2) and the rotor 18.

(Sixth Embodiment)

FIG. 10 is an enlarged view of the labyrinth sealing device according to a further embodiment. As shown in FIG. 10, a plurality of fixed sealing fins 24 are mounted on a rotor side of a high-low type of labyrinth sealing device 23 according to the present embodiment.

A plurality of high portions 26 and low portions 27, each formed in a circumferential direction of the rotor 18, are provided in alternate axial positions at predetermined intervals on a sealing base plate 25 of a nozzle diaphragm inner ring 22.

The high portions 26 and low portions 27 on the sealing base plate 25, and the sealing fins 24 on the rotor 18 are arranged so that one high portion 26 or one low portion 27 and one sealing fin 24 face each other in the axial direction of the rotor 18.

The labyrinth sealing device 23 with the plurality of sealing fins 24 is thus constructed.

In conventional steam turbines, the high portions 26 and low portions 27 on the sealing base plate 25, and the sealing fins 24 on the rotor 18 are constructed to be kept free from contact. This construction generates very small clearances between the sealing fins 24 and the sealing base plate 25, reducing resistance to the rotation of the rotor 18.

The steam St that passes through the clearances, however, becomes leakage steam without contributing to the rotation of the rotor 18. The leakage steam consequently causes steam leakage loss and reduces steam turbine efficiency.

In the present embodiment, therefore, free-cutting spacers 28 each formed from a free-cutting metal are mounted between the sealing base plate 25 and the sealing fins 24 on the rotor 18.

In addition, the sealing base plate 25 with the free-cutting spacers 28 is disposed on a moving support 50 capable of moving in the axial direction of the rotor 18.

This arrangement enables the free-cutting spacers 28, mounted closer to the nozzle diaphragm inner ring 22 (see FIG. 2) of each stationary blade 21 which is a part of a fixed region, to move in the axial direction of the rotor 18 which is a part of a rotating region.

A method of mounting the free-cutting spacers 28 on the sealing base plate 25 is not limited; the spacers may be fixed by brazing, for example.

The free-cutting metal forming the free-cutting spacers 28 according to the present embodiment is an abradable material excellent in workability. For example, even if the free-cutting spacers 28 on the sealing base plate 25 and distal ends of the sealing fins 24 on the rotor 18 come into contact during rotor rotation, only the free-cutting spacers 28 are abraded and the sealing fins 24 remain undamaged. This state is shown in FIG. 11.

In order to facilitate understanding of the present embodiment, conventional technology and a problem associated therewith are described below using the accompanying drawings.

Figure 11A:
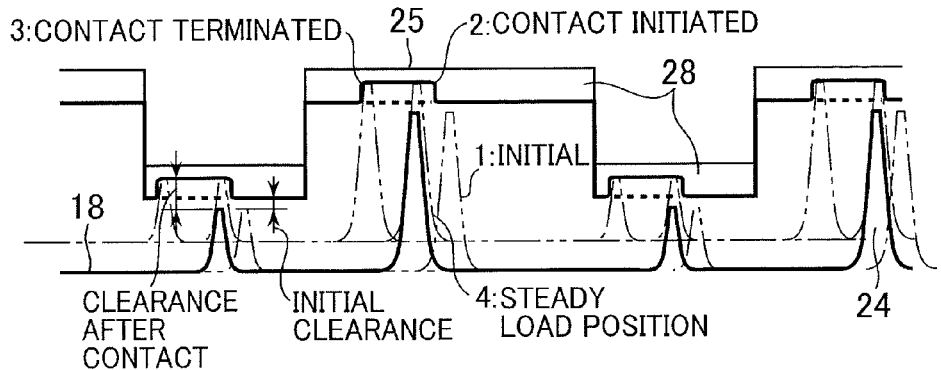
FIGS. 11A to 11D are diagrams that illustrate differences in effectiveness between yet another conventional labyrinth sealing device and the labyrinth sealing device shown in FIG. 10.

In a conventional technique where spacers formed from a highly workable material such as an abradable material are used at positions opposed to sealing fins 24, contact between the free-cutting spacers 28 and the sealing fins 24 abrades the free-cutting spacers 28 and generates clearances larger than preset ones, above the sealing fins 24. This state is shown in FIG. 11A. If the clearances are dimensionally increased by such contact, since the amount of leakage steam at the seals will increase according to the particular dimensional increases in the clearances, the increase in the amount of leakage steam will cause a problem of a decrease in steam turbine efficiency.

That is, the conventional technique causes the following problem. Contact between the free-cutting spacers 28 and the sealing fins 24 is estimated to occur through four process steps: (1) under an initial state of turbine assembly, a small amount of steam flows into the steam turbine, (2) the free-cutting spacers 28 and the sealing fins 24 initiate contact for reasons such as thermal deformation of the diaphragm, thermal deformation of the casing, or thermal elongation of the rotor, (3) then terminate contact after thermally stabilizing over time, and (4) reach a steady load position. Thermal stability is obtained and the high-temperature high-pressure steam St is introduced into the steam turbine to enable steady operation for stable power generation. The clearances in this case will have their magnitude significantly increased relative to that of the clearances existing during the initial state (1) of turbine assembly.

A consequential increase in the amount of leakage at the seals during steady operation will result in the problem of reduced turbine efficiency.

A problem associated with the conventional technique has been discussed above. Focus will be returned to the description of the present embodiment.

Figure 11B:
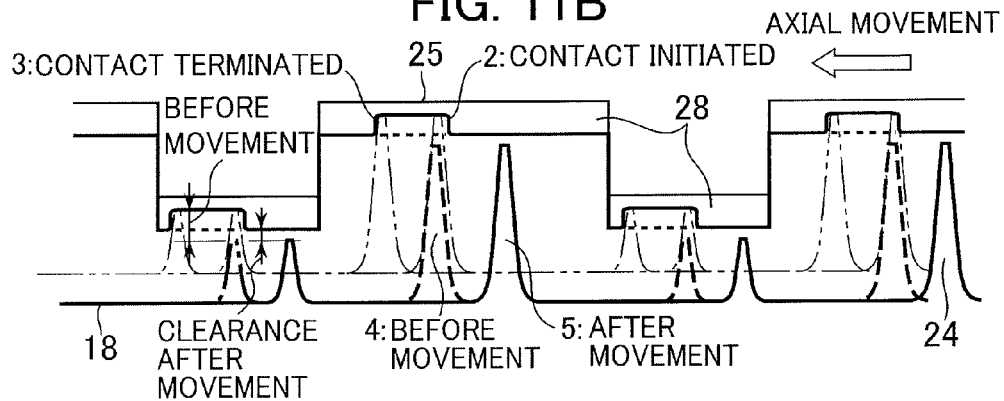

The free-cutting spacers 28 in the present embodiment are constructed to be axially movable with respect to the rotor 18 that is part of the rotating region. As shown in FIG. 11B, for example, upon the high-temperature high-pressure steam St being introduced into the steam turbine to implement steady operation after thermal stability has been reached and contact terminated, the free-cutting spacers 28 move axially with respect to the rotor 18, part of the rotating region. A positional relationship of the sealing fins 24 with respect to the free-cutting spacers 28 remaining before the movement, or under state (4), is represented with a dashed line, and a positional relationship of the sealing fins 24 with respect to the free-cutting spacers 28 remaining after the movement, or under state (5), is represented with a solid line. The free-cutting spacers 28 at the positions opposed to those of the sealing fins 24 existing after the movement, are maintained in a non-contact state. The clearances above the sealing fins 24, therefore, remain nearly equal to those existing under the initial state of the turbine. In other words, even if the free-cutting spacers 28 have their surfaces abraded by contact, since the clearances above the seals during steady operation are left dimensionally equal to initial ones, high turbine efficiency is maintained because of no increase in leakage.

Since the free-cutting spacers 28 are mounted between the sealing base plate 25 and the sealing fins 24 on the rotor 18 and since the sealing base plate 25 with the free-cutting spacers 28 is mounted to be movable in the axial direction of the rotor 18, even if the sealing fins 24 and the free-cutting spacers 28 come into contact, this causes no such decrease in turbine efficiency that arises from an increase in leakage from the seals during steady operation. This develops an excellent effect in that even if the surfaces of the free-cutting spacers 28 are abraded by contact, high turbine efficiency is maintained without an increase in leakage.

Next, a mechanism that moves axially the sealing base plate 25 of the sealing device according to the present embodiment is described below.

The sealing base plate 25 in the present embodiment is mounted so as to be movable in the axial direction of the rotor 18. As shown in FIG. 10, the nozzle diaphragm inner ring 22 includes a hollow preload chamber 51, in which is equipped with a pressure head 52 supported by inner walls of the preload chamber 51 and movable radially towards the rotor 18. The pressure head 52 is connected at its radial inner-surface side to a downward pressure support 53, the radial inner-surface side being formed in a direction of the rotor (for convenience' sake, the radial inner-surface side is hereinafter referred to as the rotor-oriented radial inner-surface side). The downward pressure support 53 is a member supported by a support formed in the preload chamber 51, and movable radially towards the rotor. The downward pressure support 53 includes a downward inclined contact surface 53a at an end portion of the rotor-oriented radial inner-surface side, the downward inclined contact surface 53a being inclined in the axial direction of the rotor. The downward pressure support 53 is in contact with the moving support 50 via the downward inclined contact surface 53a. The moving support 50, a member capable of moving in the axial direction of the rotor 18, is provided in the innermost surface side of the preload chamber 51. An inclined contact surface 50a that engages with the downward pressure support 53 and has a fixed angle of inclination along the downward inclined contact surface 53a of the downward pressure support 53 is formed at the end portion of the outer circumference surface of the moving support 50 in the radial direction towards the rotor.

A rotor-oriented radial loading pressure that the pressure head 52 has received from the steam is transformed into an axial force at the inclined contact surface between the downward pressure support 53 and the moving support 50, and the moving support 50 is pushed in an axial direction. The moving support 50 is resiliently supported by a return spring 54 (urging means) disposed in the preload chamber 51, and is urged by the return spring 54 with a considerable urging force acting in a direction opposite to the steam pressure-loading direction. The return spring 54 does not have its mounting position limited to the example of FIG. 10; the return spring can be disposed at any position where the moving support 50 can be urged in the direction opposite to the steam pressure-loading direction.

The preload chamber 51 is constructed to communicate with the outside of the nozzle diaphragm inner ring 22 through a steam passageway 46 so that the steam St circulating through the outside of the nozzle diaphragm inner ring 22 will flow into the preload chamber 51. The pressure head 52, when pressurized by the steam St, will be forced inward by the steam pressure to move in the radial direction towards the rotor 18, and the downward inclined contact surface 53a of the downward pressure support 53 which follows the movement of the pressure head 52 will move the inclined contact surface 50a of the moving support 50 radially towards the rotor.

The rotor-oriented radial loading pressure that the pressure head 52 has received is transformed into an axial force at the inclined contact surface between the downward pressure support 53 and the moving support 50, and the moving support 50 is pushed in the axial direction of the rotor to move in the rotor axial direction.

The sealing base plate 25 is mounted at an inner-surface front end of the moving support 50. A guide 56 is also mounted on the moving support 50. The guide 56 comes into contact with a guide acceptor 57 protruding towards an internal region of the preload chamber 51, and prevents the moving support 50 and the sealing base plate 25 from turning and taking an unstable posture when a moment of the steam pressure upon the pressure head 52 and the sealing base plate 25 is applied. Smooth reciprocation in the axial direction of the rotor is thus attained.

The pressure head 52 is preferably formed integrally with the downward pressure support 53, for example. A method of mounting the pressure head 52 on the downward pressure support 53 is not limited; for example, screws not shown may be used to fix the pressure head 52 to the downward pressure support 53. The guide 56 may be formed integrally with the moving support 50, for example. A way to mount the sealing base plate 25 on the moving support 50 is not limited; for example, screws not shown may be used to fix the sealing base plate 25 to the moving support 50.

The pressure head 52, downward pressure support 53, moving support 50, guide 56, and sealing base plate 25 included constitute a movable region of a driving unit.

When the moving support 50 is being supported by the urging force of the return spring 54 at a position on the side opposite to the moving direction of the moving support moved inward by the steam pressure in the axial direction of the rotor, the sealing base plate 25 lies at a position on the side opposite to the moving direction of the moving support moved inward by the steam pressure in the axial direction of the rotor.

The labyrinth sealing device 23 in the present embodiment includes the preload chamber 51, the steam passageway 46, the pressure head 52, the downward pressure support 53 with an inclined contact surface, the moving support 50 with another inclined contact surface, the guide 56, and the return spring 54, in addition to the sealing base plate 25.

Figure 12:
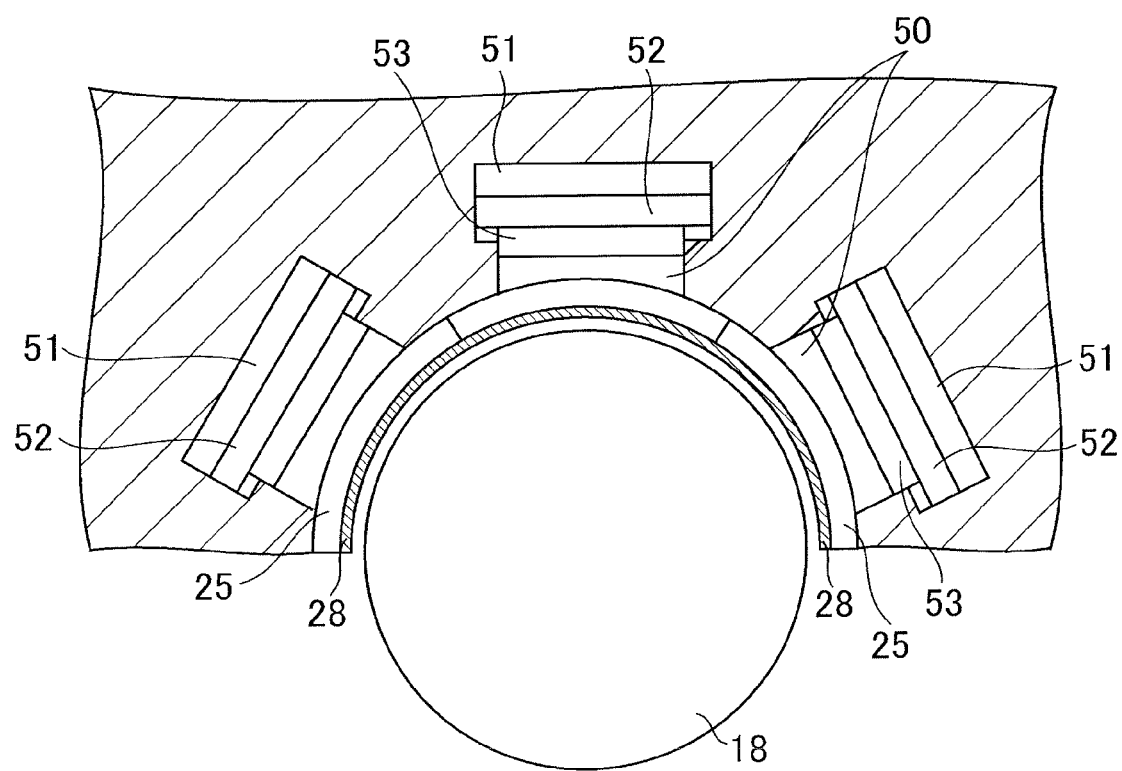
FIG. 12 is a sectional view through X1-X1 in FIG. 10.

FIG. 12 is a sectional view through X1-X1 in FIG. 10. The labyrinth sealing device 23 includes a plurality of segment bodies, as shown in FIG. 12. The segment bodies each have the preload chamber 51, the steam passageway 46, the pressure head 52, the downward pressure support 53, the moving support 50, the guide 56, the guide acceptor 57, and the return spring 54. These segment bodies are arranged at a plurality of fixed positions at fixed intervals around the rotor 18, thereby to constitute the labyrinth sealing device 23.

A sealing structure that includes the labyrinth sealing device 23 and the free-cutting spacers 28 on the sealing base plate 25 is built into the steam turbine 3.

When the steam St that has been generated by a boiler 2 flows into the steam turbine 3, and the steam St then passes between one stationary blade 21 and one moving blade 17, part of the steam St circulates through the steam passageway 46 and flows into the preload chamber 51.

The pressure of the steam St flowing into the preload chamber 51 pushes the pressure head 52 in the radial direction towards the rotor, and the radial force towards the rotor is transformed into an axial force at the inclined contact surface between the downward pressure support 53 and the moving support 50. However, when the loading force that moves the moving support 50 in the axial direction is smaller than the urging force of the return spring 54, the return spring 54 is supporting the moving support 50 at the position on the opposite side with respect to the moving direction of the moving support 50 moved inward by the steam pressure in the axial direction of the rotor.

For example, if the load connected to the steam turbine 3 (see FIG. 1) increases and thus the pressure of the steam St flowing into the steam turbine 3 increases, the pressure of the steam St flowing into the preload chamber 51 also increases. After this, the steam pressure pushes the pressure head 52 in the radial direction towards the rotor, and the radial force towards the rotor is transformed into an axial force at the inclined contact surface between the downward pressure support 53 and the moving support 50. When the loading force that moves the moving support 50 in the axial direction of the rotor 18, increases above the urging force of the return spring 54, the steam pressure moves the moving support 50 in the axial direction of the rotor 18. Also, the sealing base plate 25 connected to the moving support 50 moves in an axial direction following the moving support 50.

If the turbine is constructed so that after the moving support 50 has moved to an axial stopping position of steam pressure loading, the surfaces of the free-cutting spacers 28 on the sealing base plate 25 that are not in contact will be opposed to the surfaces of the sealing fins 24 on the rotor 18, clearances between the sealing fins 24 and free-cutting spacers 28 that face each other can be initialized when the pressure of the steam St flowing into the preload chamber 51 increases. The initialization will minimize the clearances between the sealing fins 24 and the free-cutting spacers 28, and improve sealing performance between the stationary blades 21 and the rotor 18.

Since the steam St circulating in the steam turbine 3 decreases in pressure while expanding downstream from an upstream side of the steam, the labyrinth sealing device 23 of each stationary blade 21 may be constructed so that the return springs 54 at more downstream positions in the flow direction of the steam St have a smaller urging force.

In the steam turbine 3 with the thus-constructed sealing structure built therein, during a start of turbine operation at low steam pressure, relative positions of the free-cutting spacers 28 on the sealing base plate 25 with respect to those of the sealing fins 24 on the rotor 18 are positioned in a direction opposite to the axial steam-pressure loading direction.

In the thermally unstable starting state, therefore, the relative positions of the free-cutting spacers 28 on the sealing base plate 25 with respect to those of the sealing fins 24 on the rotor 18 are positioned in the direction opposite to the axial steam-pressure loading direction. At this position, contact between the sealing fins 24 and the free-cutting spacers 28 often arises from thermal deformation.

If this actually happens, although the free-cutting spacers 28 become recessed by contact, no damage is caused to the sealing fins 24 because of contact with the spacers 28.

When an increase in the load of the steam turbine 3 increases the pressure of the steam St, the free-cutting spacers 28 move to the axial stopping position of steam pressure loading. The movement dimensionally minimizes the clearances between the sealing fins 24 and the free-cutting spacers 28, thus improving sealing performance between the stationary blades 21 and the rotor 18. Therefore, the efficiency of the steam turbine 3 improves.

A replacement for the free-cutting spacers 28 can be those using a gas-permeable metal. This gas-permeable metal is a porous metallic material having a structure with a concatenation of spatial portions (pores) in the material to enable a gas (steam St) to flow through. The gas-permeable metal, because of its excellent workability, can be used to construct free-cutting spacers 28. Using free-cutting spacers 28 formed from the gas-permeable metal is contributory to not only preventing damage to the sealing fins 24, but also removing contact heat caused by contact between the sealing fins 24 and the free-cutting spacers 28, and preventing thermal deformation due to the contact heat.

Figure 13:
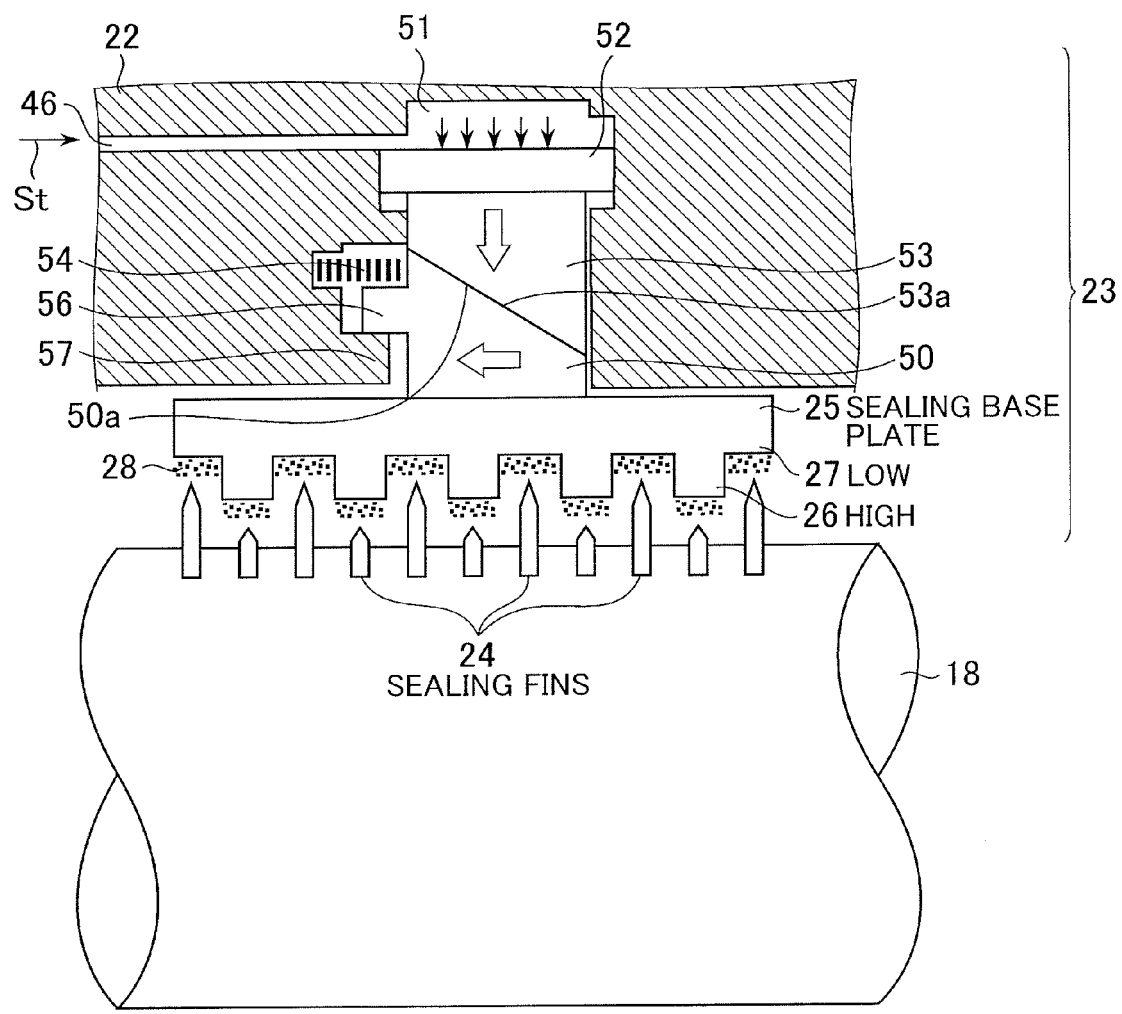
FIG. 13 is an enlarged view of a labyrinth sealing device for a steam load applied in a direction opposite to that of the embodiment shown in FIG. 10.

An example of a configuration in which the position of the steam passageway 46 through which the steam St flows into the preload chamber 51 is provided in the opposite direction with respect to the moving direction of the moving support moved inward by the steam pressure in the axial direction of the rotor has been described with reference to FIG. 10. However, this example does not limit the configuration of the present invention. In the invention, the steam St is concentrated upon the preload chamber 51 and after the steam pressure has temporarily acted upon in the radial direction via the radially movable downward pressure support 53, the radial force is once again transformed into axial force at the moving support 50. This construction makes freely determinable the moving direction of the sealing base plate 25 and a recovery direction of the steam via the steam passageway 46. For example, even if as shown in FIG. 13, the position of the steam passageway 46 through which the steam St flows into the preload chamber 51 is provided in the same direction as the moving direction of the moving support moved inward by the steam pressure in the axial direction of the rotor, substantially the same description as in the example of FIG. 10 can be made and exactly the same advantageous effects can be obtained. The present invention is therefore effective in that flexibility of design can be enhanced without being affected by the relationship between the position of the steam passageway 46 and the movement position of the moving support moved inward by the steam pressure in the axial direction of the rotor.

Figure 11C:
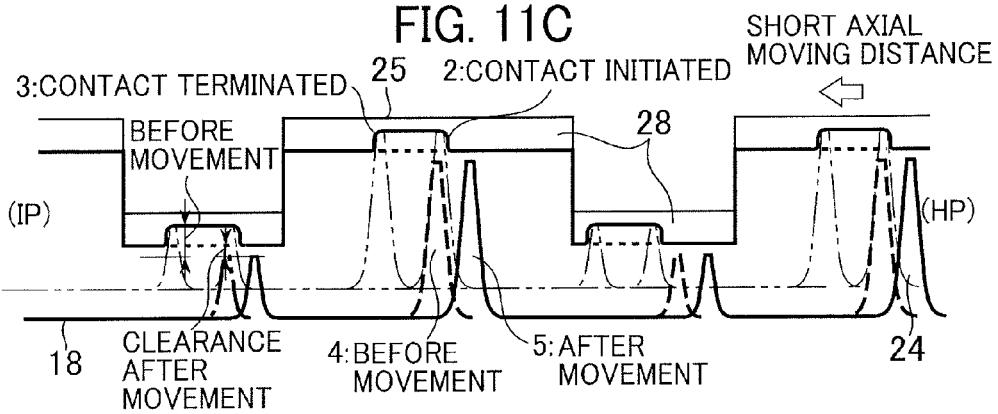
Figure 11D:
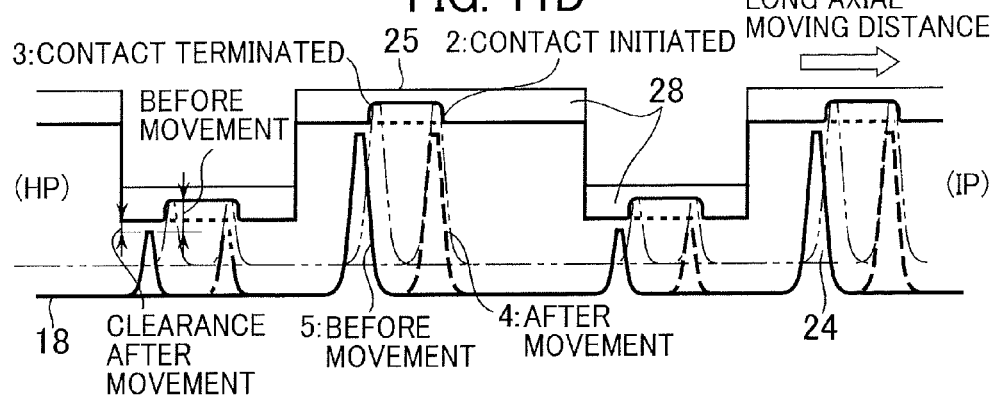

For example, in the case that a high-pressure (HP) steam turbine and an intermediate-pressure (IP) steam turbine are constructed integrally and the rotors of both are coupled to each other, arrangement of steam pipelines may render it necessary for steam intake pipes of both to be arranged near a middle region of a boundary between the HP and IP steam turbines. In such a case, because of the rotors being coupled to each other, although relative movements of the rotors with respect to the casings due to rotor thermal elongation will depend upon positions of thrust bearings, the rotor in one of the two turbines will move from the HP side towards the IP side, as shown in FIG. 11C. In the other turbine, however, relative movement of the rotor will head from the IP side towards the HP side, as shown in FIG. 11D.

Suppose that under a thermally unstable state of the turbine during startup, the sealing fins 24 and the free-cutting spacers 28 come into contact and the surfaces of the free-cutting spacers 28 become recessed, and that upon thermal stability being obtained after that, the turbine enters into steady operation. Positions of the sealing fins 24 during the start of steady operation are considered to be near a starting position of contact, not at a middle position of the recess on the surface of each free-cutting spacer 28. At this time, if the sealing device is constructed so that the steam pressure moves the sealing base plate 25 from the HP side, towards the IP side, the clearances in one turbine can be minimized by moving the sealing base plate 25 slightly in the axial direction. The sealing base plate in the other turbine, however, needs to be moved through a distance equivalent to, at least, axial length of the recess on the surface of each free-cutting spacer 28 due to differential thermal elongation.

At such turbine seals that require great deals of movement, since necessity arises to arrange sealing fins 24 at wide pitches to prevent contact between the sealing fins 24 and the high portions 26, sealing fins 24 need to be arranged axially roughly. This arrangement will cause a problem of steam leakage being increased by a decrease in the number of restrictions obtained by the sealing fins 24. Conversely, an increase in the number of restrictions obtained by the sealing fins 24 will cause a problem of costs being significantly increased by an increase in rotor length.

In the construction of the present invention, however, the moving direction of the sealing base plate 25 and the recovery direction of the steam via the steam passageway 46 can be freely determined. For example, if a configuration is used that introduces from the HP side the steam St supplied to the preload chamber 51 via the steam passageway 46, the steam passageway 46 has its position limited to the HP side. In the construction of the present invention, however, the sealing base plate 25 can be freely designed to be movable in either direction, whether it being from the HP side to the IP side or vice versa.

In the present invention, therefore, since the relationship between the position of the steam passageway 46 and the movement position of the moving support moved inward by the steam pressure in the axial direction of the rotor is not affected, the clearances in either of the turbines can be minimized by moving the sealing base plate 25 slightly in the axial direction, so that compact and high-performance steam turbines can be supplied. Substantially the same advantageous effects can also be obtained in a mutually coupled high-pressure and low-pressure turbine arrangement and in a low-pressure turbine equipped with a steam intake pipeline centrally therein.

The above has described an example of a configuration with the free-cutting spacers 28 mounted on the labyrinth sealing device 23, and an example of a configuration in which the sealing base plate 25 forming part of the sealing device 23 is mounted close to the nozzle diaphragm inner ring 22 so as to be movable in an axial direction with respect to the rotor 18. However, these examples do not limit the configuration of the present invention.

Figure 14:
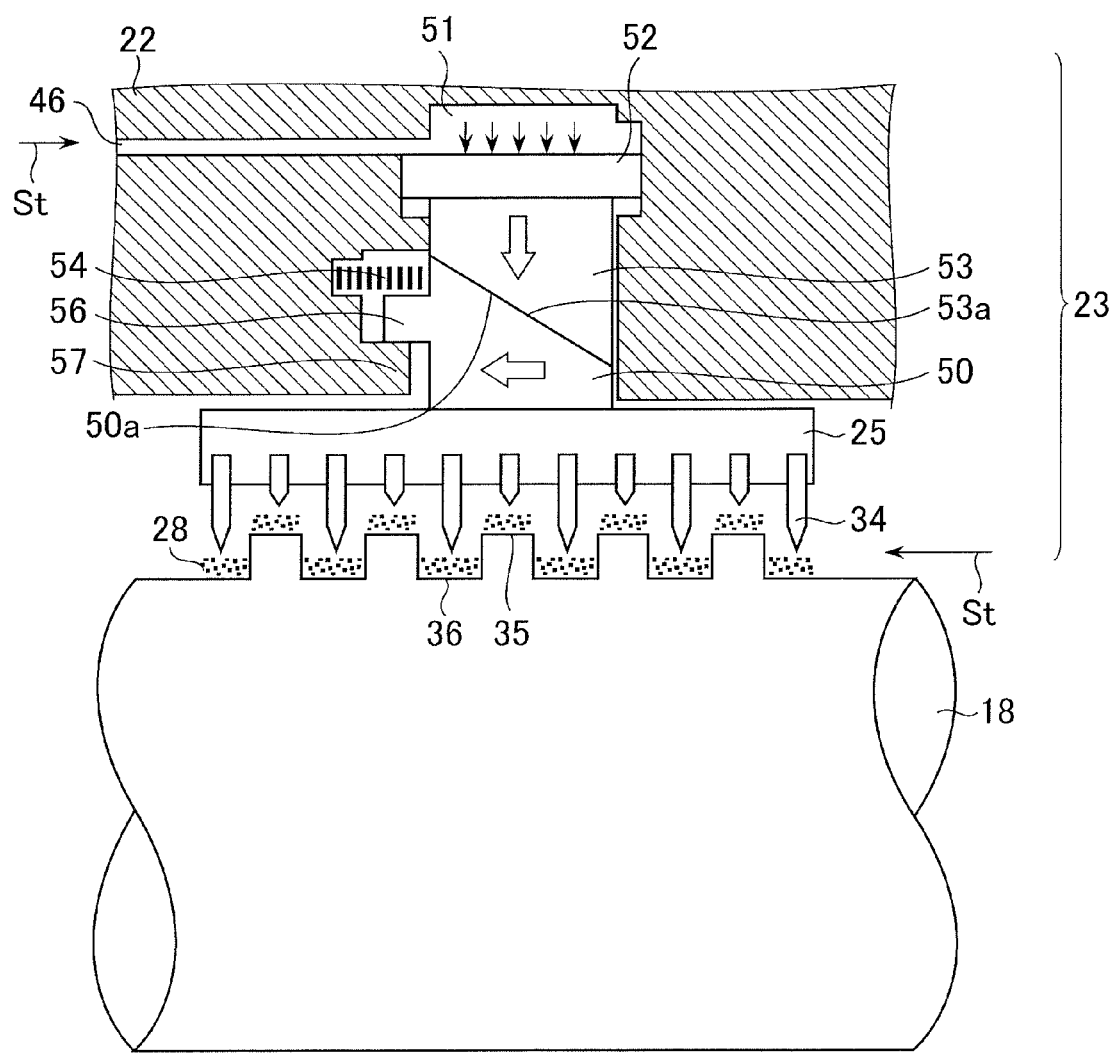
FIG. 14 is an enlarged view of a labyrinth sealing device according to a further embodiment of the present invention.

For example, the labyrinth sealing device 23 can be of a high-low type shown in FIG. 14, in addition to the shapes shown in FIGS. 10 and 13. The present invention can also be applied to the high-low type of labyrinth sealing device shown in FIG. 14.

(Seventh Embodiment)

Next, a seventh embodiment of the present invention will be described.

The present embodiment shown in FIG. 14 includes free-cutting spacers 28 each formed from a free-cutting metal and mounted between surfaces of sealing fins 34 on a sealing base plate 25, and surfaces of high portions 35 and low portions 36 of a rotor 18.

In addition, the sealing base plate 25 with the sealing fins 34 is disposed to be movable in an axial direction of the rotor 18.

Figure 15A:
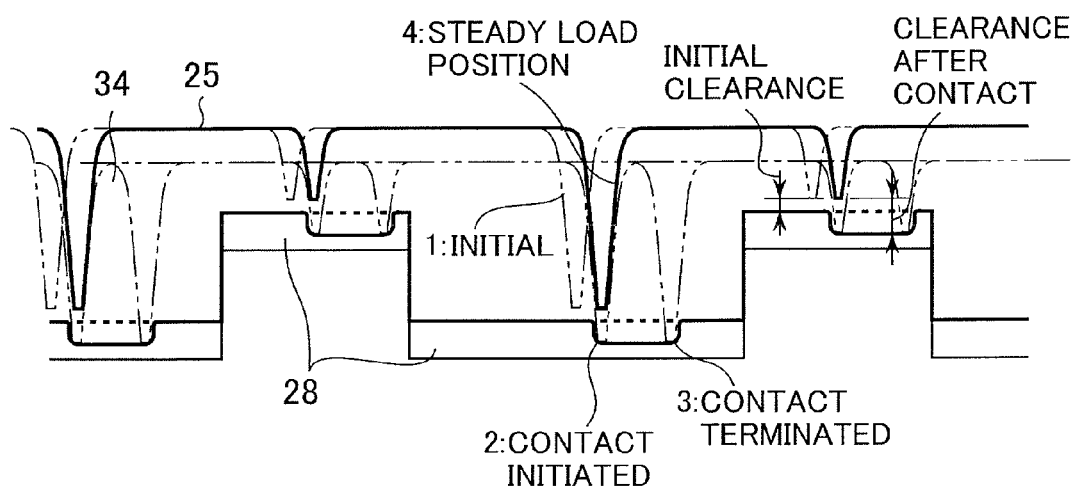
FIGS. 15A and 15B are diagrams that illustrate differences in effectiveness between a further conventional labyrinth sealing device and the labyrinth sealing device shown in FIG. 14.
Figure 15B:
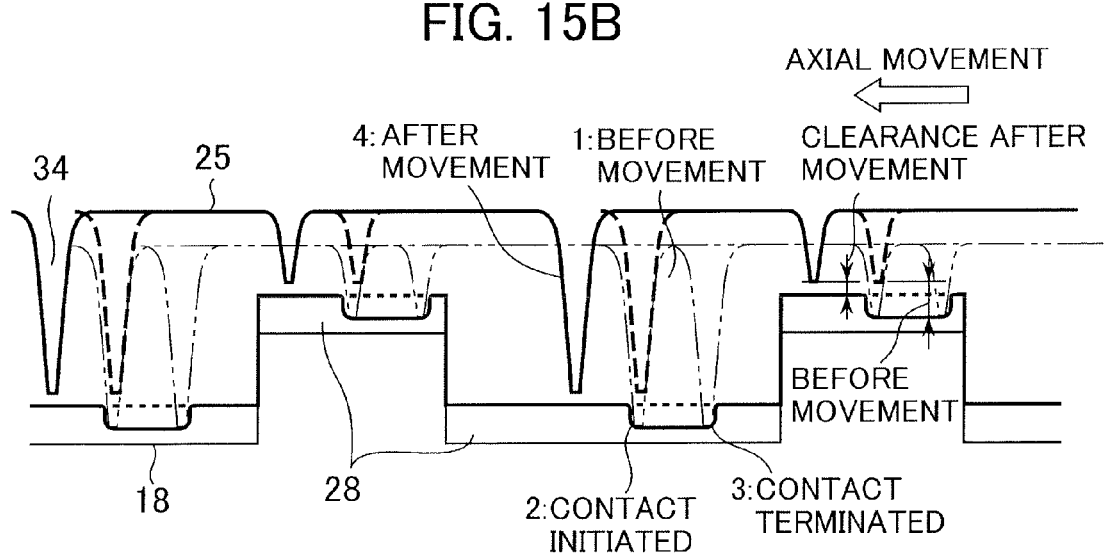

The free-cutting metal forming the free-cutting spacers 28 according to the present embodiment is an abradable material excellent in workability. For example, even if the free-cutting spacers 28 on the rotor 18 and distal ends of the sealing fins 34 on the sealing base plate 25 come into contact during rotor rotation, only the free-cutting spacers 28 are abraded and the sealing fins 34 remain undamaged. This state is shown in FIG. 15B.

In order to facilitate understanding of the present example, conventional technology and a problem associated therewith are described below with reference to the accompanying drawings.

In a conventional technique where spacers formed from a highly workable material such as an abradable material are used at positions opposed to sealing fins 34, contact between the free-cutting spacers 28 and the sealing fins 34 abrades the free-cutting spacers 28 and generates clearances larger than preset ones, above the sealing fins 34. This state is shown in FIG. 15A. If the clearances are dimensionally increased by such contact, since the amount of leakage steam at the seals will increase according to the particular dimensional increases in the clearances, the increase in the amount of leakage steam will cause a problem of a decrease in steam turbine efficiency.

That is, the conventional technique causes the following problem. Contact between the free-cutting spacers 28 and the sealing fins 34 is estimated to occur through four process steps: (1) under an initial state of turbine assembly, a small amount of steam flows into the steam turbine, (2) the free-cutting spacers 28 and the sealing fins 34 initiate contact for reasons such as thermal deformation of the diaphragm, thermal deformation of the casing, or thermal elongation of the rotor, (3) then terminate contact after thermally stabilizing over time, and (4) reach a steady load position. Thermal stability is obtained and the high-temperature high-pressure steam St is introduced into the steam turbine to enable steady operation for stable power generation. The clearances in this case will, as shown in FIG. 15A, have their magnitude significantly increased relative to that of the clearances existing during the initial state (1) of turbine assembly.

A consequential increase in the amount of leakage at the seals during steady operation will result in the problem of reduced turbine efficiency. This is the problem described above in connection with the conventional technique. Focus will be returned to the description of the present embodiment.

The sealing fins 34 in the present embodiment are constructed to be movable in an axial direction relative to the rotor 18. As shown in FIG. 15B, for example, upon the high-temperature high-pressure steam St being introduced into the steam turbine to implement steady operation after thermal stability has been reached and contact terminated, the sealing fins 34 move in the axial direction with respect to the free-cutting spacers 28 on the rotor 18, part of the rotating region. The free-cutting spacers 28 at the positions opposed to those of the sealing fins 34 existing after the movement, are maintained in a non-contact state. The clearances above the sealing fins 34, therefore, remain nearly equal to those existing under the initial state of the turbine. In other words, even if the free-cutting spacers 28 have their surfaces abraded by contact, since the clearances above the seals during steady operation are left dimensionally equal to initial ones, high turbine efficiency is maintained because of no increase in the amount of leakage.

Since the sealing base plate 25 with the sealing fins 34 is mounted to be movable in the axial direction of the rotor 18, even if the sealing fins 34 and the free-cutting spacers 28 come into contact, this causes no such decrease in turbine efficiency that arises from an increase in the amount of leakage from the seals during steady operation. This develops an excellent effect in that even if the surfaces of the free-cutting spacers 28 are abraded by contact, high turbine efficiency is maintained without an increase in the amount of leakage.

In addition, the sealing base plate 25 in the present embodiment is mounted so as to be movable in the axial direction of the rotor 18. As shown in FIG. 14, the nozzle diaphragm inner ring 22 includes a hollow preload chamber 51, in which is equipped with a pressure head 52 supported by inner walls of the preload chamber 51 and movable radially towards the rotor 18. The pressure head 52 is connected at its radial inner-surface side to a downward pressure support 53, the radial inner-surface side being formed in a direction of the rotor (for convenience' sake, the radial inner-surface side is hereinafter referred to as the rotor-oriented radial inner-surface side). The downward pressure support 53 is a member supported by a support formed in the preload chamber 51, and movable radially towards the rotor. The downward pressure support 53 includes a downward inclined contact surface 53a at an end portion of the rotor-oriented radial inner-surface side, the downward inclined contact surface 53a being inclined in the axial direction of the rotor. The downward pressure support 53 is in contact with the moving support 50 via the downward inclined contact surface 53a. The moving support 50, a member capable of moving in the axial direction of the rotor 18, is provided in the innermost surface side of the preload chamber 51. An inclined contact surface 50a has a fixed angle of inclination along the downward inclined contact surface 53a of the downward pressure support 53 is formed at an end portion of the outer circumference surface of the moving support 50 in the radial direction towards the rotor.

A rotor-oriented radial loading pressure that the pressure head 52 has received is transformed into an axial force at the inclined contact surface between the downward pressure support 53 and the moving support 50, and the moving support 50 is pushed in an axial direction. The moving support 50 is resiliently supported by a return spring 54 (urging means), and is urged by the return spring 54 with a considerable urging force acting in a direction opposite to the moving direction of the moving support moved inward by the steam pressure in the axial direction of the rotor.

The preload chamber 51 is constructed to communicate with the outside of the nozzle diaphragm inner ring 22 through a steam passageway 46 so that the steam St circulating through the outside of the nozzle diaphragm inner ring 22 will flow into the preload chamber 51. The pressure head 52, when pressurized by the steam St, will be forced inward by the steam pressure. The rotor-oriented radial loading pressure that the pressure head 52 has received is transformed into an axial force at the inclined contact surface between the downward pressure support 53 and the moving support 50, and the moving support 50 is pushed in the axial direction to move in the axial direction of the rotor 18.

The sealing base plate 25 is mounted at an inner-surface front end of the moving support 50. A guide 56 is also mounted on the moving support 50. The guide 56 comes into contact with a guide acceptor 57 protruding towards an internal region of the preload chamber 51, and prevents the moving support 50 and the sealing base plate 25 from turning and taking an unstable posture when a moment of the steam pressure upon the pressure head 52 and the sealing base plate 25 is applied. Smooth reciprocation in the axial direction of the rotor is thus attained.

The pressure head 52, downward pressure support 53, moving support 50, guide 56, and sealing base plate 25 included constitute a driving unit (movable region).

When the moving support 50 is being supported by the urging force of the return spring 54 at a position on an opposite side with respect to the moving direction of the moving support moved inward by the steam pressure in the axial direction of the rotor, the sealing base plate 25 lies at a position on the side opposite to the moving direction of the moving support moved inward by the steam pressure in the axial direction of the rotor.

The labyrinth sealing device 23 in the present embodiment includes the preload chamber 51, the steam passageway 46, the pressure head 52, the downward pressure support 53 with an inclined contact surface, the moving support 50 with another inclined contact surface, the guide 56, and the return spring 54, in addition to the sealing base plate 25.

A sealing structure that includes the labyrinth sealing device 23 and the free-cutting spacers 28 on the rotor 18 is built into the steam turbine 3.

When the steam St that has been generated by a boiler 2 flows into the steam turbine 3, and the steam St then passes between one stationary blade 21 and one moving blade 17, part of the steam St circulates through the steam passageway 46 and flows into the preload chamber 51.

The pressure of the steam St flowing into the preload chamber 51 pushes the pressure head 52 in the radial direction towards the rotor, and the radial force towards the rotor is transformed into an axial force at the inclined contact surface between the downward pressure support 53 and the moving support 50. However, when the loading force that moves the moving support 50 in the axial direction is smaller than the urging force of the return spring 54, the return spring 54 is supporting the moving support 50 at the position on the opposite side with respect to the moving direction of the moving support 50 moved inward by the steam pressure in the axial direction of the rotor.

For example, if the load connected to the steam turbine 3 (see FIG. 1) increases and thus the pressure of the steam St flowing into the steam turbine 3 increases, the pressure of the steam St flowing into the preload chamber 51 also increases. After this, the steam pressure pushes the pressure head 52 in the radial direction towards the rotor, and the radial force towards the rotor is transformed into an axial force at the inclined contact surface between the downward pressure support 53 and the moving support 50. When the force that moves the moving support 50, that is, the pressure of the steam St, increases above the urging force of the return spring 54, the steam pressure moves the moving support 50 in the axial direction of the rotor 18. Also, the sealing base plate 25 connected to the moving support 50 moves in the axial direction of steam pressure loading.

If the turbine is constructed so that after the moving support 50 has moved to a stopping position of steam pressure loading, the surfaces of the free-cutting spacers 28 on the rotor 18 that are not in contact will be opposed to the surfaces of the sealing fins 34 on the sealing base plate 25, clearances between the sealing fins 34 and free-cutting spacers 28 that face each other can be initialized when the pressure of the steam St flowing into the preload chamber 51 increases. The initialization will minimize the clearances between the sealing fins 34 and the free-cutting spacers 28, and improve sealing performance between the stationary blades 21 and the rotor 18.

Since the steam St circulating in the steam turbine 3 decreases in pressure while expanding downstream from an upstream side of the steam, the labyrinth sealing device 23 of each stationary blade 21 may be constructed so that the return springs 54 at more downstream positions in the flow direction of the steam St have a smaller urging force.

In the steam turbine 3 with the thus-constructed sealing structure built therein, during a start of turbine operation at low steam pressure, relative positions of the sealing fins 34 on the sealing base plate 25 with respect to those of the free-cutting spacers 28 on the rotor 18 are positioned in a direction opposite to the steam pressure-loading direction.

In the thermally unstable starting state, therefore, the relative positions of the sealing fins 34 on the sealing base plate 25 with respect to those of the free-cutting spacers 28 on the rotor 18 are positioned in the direction opposite to the steam pressure-loading direction. At this position, contact between the sealing fins 34 and the free-cutting spacers 28 often arises from thermal deformation.

If this actually happens, although the free-cutting spacers 28 become recessed by contact, no damage is caused to the sealing fins 34 because of contact with the spacers 28.

When an increase in the load of the steam turbine 3 increases the pressure of the steam St, the sealing fins 34 move to the axial stopping position of steam pressure loading. The movement dimensionally minimizes the clearances between the sealing fins 34 and the free-cutting spacers 28, thus improving sealing performance between the stationary blades 21 and the rotor 18. Therefore, efficiency of the steam turbine 3 improves.

A replacement for the free-cutting spacers 28 can be those using a gas-permeable metal. The gas-permeable metal, because of its excellent workability, can be used to construct free-cutting spacers 28. Using free-cutting spacers 28 formed from the gas-permeable metal is contributory to not only preventing damage to the sealing fins 34, but also removing contact heat caused by contact between the sealing fins 34 and the free-cutting spacers 28, and preventing thermal deformation due to the contact heat. In the present embodiment, since the relationship between the position of the steam passageway 46 and the movement position of the moving support moved inward by the steam pressure in the axial direction of the rotor is not affected, clearances can be minimized by moving the sealing base plate 25 slightly in the axial direction, as in the first embodiment, so that compact and high-performance steam turbines can be supplied. Substantially the same advantageous effects can also be obtained in a mutually coupled high-pressure and low-pressure turbine arrangement and in a low-pressure turbine equipped with a steam intake pipeline centrally therein.

The above has described an example of a configuration with the free-cutting spacers 28 mounted on the rotor 18, and an example of a configuration in which the sealing base plate 25 forming part of the labyrinth sealing device 23 is mounted close to the nozzle diaphragm inner ring 22 so as to be movable in an axial direction of the rotor 18. However, these examples do not limit the configuration of the present invention.

Figure 16:
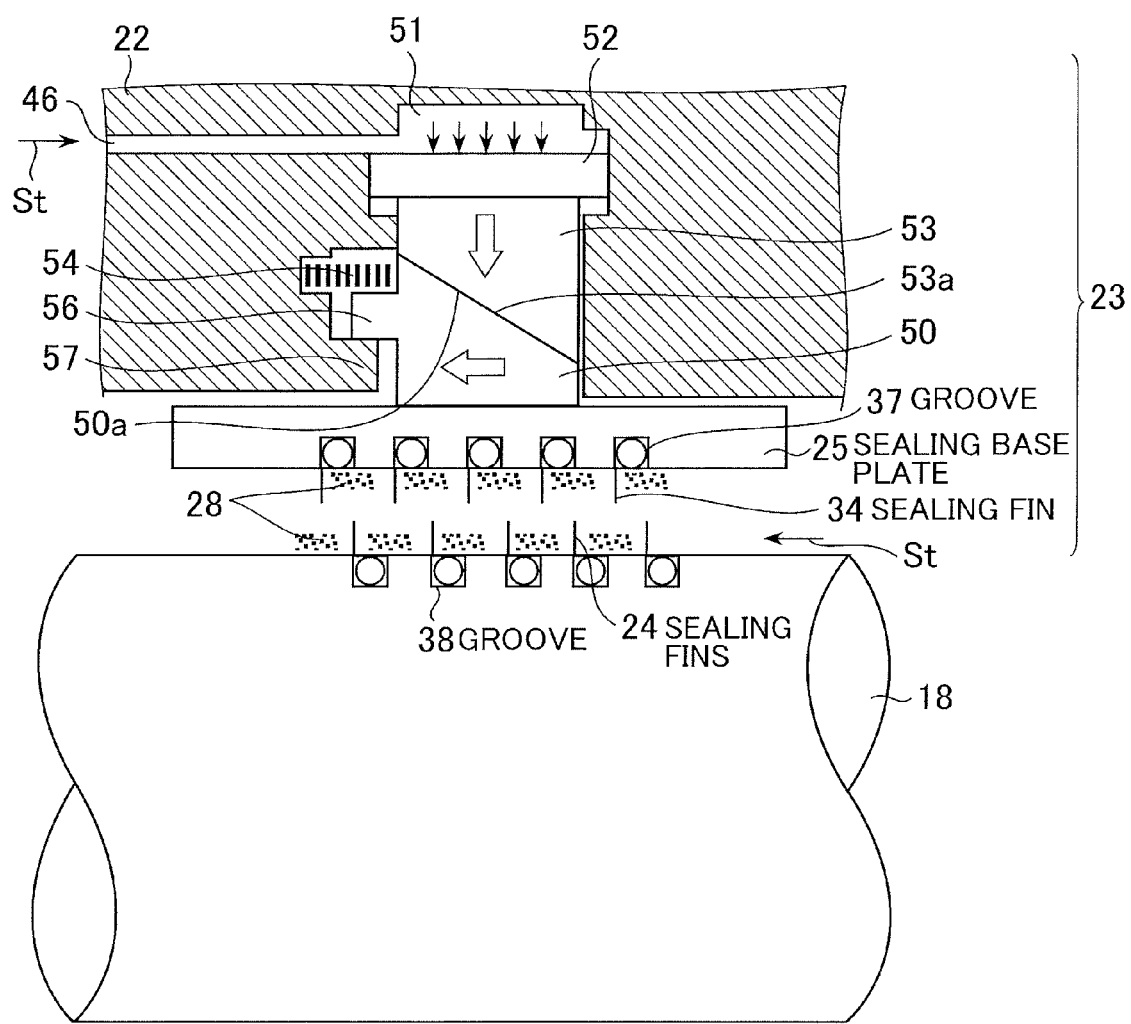
FIG. 16 is an enlarged view of a labyrinth sealing device according to a further embodiment.

For example, the labyrinth sealing device 23 can be of a stagger type shown in FIG. 16, in addition to the shapes shown in FIGS. 10, 13, and 14. The present invention can also be applied to the stagger type of labyrinth sealing device shown in FIG. 16.

(Eighth Embodiment)

Next, an eighth embodiment of the present invention will be described.

As shown in FIG. 16, a nozzle diaphragm inner ring 22 according to the present embodiment includes a sealing base plate 25 having a plurality of sealing fins 34.

The sealing base plate 25 is provided with a plurality of grooves 37 lined up at equal intervals in an axial direction of a rotor 18 and formed in a peripheral direction, and one sealing fin 34 is fixed to each of the grooves 37 by caulking.

The rotor 18 is also provided with a plurality of grooves 38 lined up at equal intervals in the axial direction of the rotor 18 and formed in a circumferential direction of the rotor, and one sealing fin 24 is fixed to each of the grooves 38 by caulking.

The sealing fins 34 on the sealing base plate 25 and the sealing fins 24 on the rotor 18 are arranged so as to overlap in an alternate fashion in the axial direction of the rotor 18.

In this way, a labyrinth sealing device 23 is constructed that includes the sealing base plate 25 having the plurality of sealing fins 34.

Free-cutting spacers 28 formed from a free-cutting metal are mounted between the rotor 18 and the sealing fins 34 on the sealing base plate 25, and between the sealing base plate 25 and the sealing fins 24 on the rotor 18, as shown.

In addition, the sealing base plate 25 with the sealing fins 34 and the free-cutting spacers 28 is mounted to be movable in the axial direction of the rotor 18.

All or at least part of the effects described in the embodiments shown in FIGS. 10 and 14 can be obtained by adopting the above construction.

That is, the labyrinth sealing device 23 in the present embodiment includes the preload chamber 51, the steam passageway 46, the pressure head 52, the downward pressure support 53, the moving support 50, the guide 56, and the return spring 54, in addition to the sealing base plate 25.

A sealing structure that includes the labyrinth sealing device 23 and the free-cutting spacers 28 on the rotor 18 is built into the steam turbine 3 (see FIG. 1).

Upon boiler-generated steam St flowing into the steam turbine 3, as the steam St passes between one stationary blade 21 and one moving blade 17, part of the steam St circulates through the steam passageway 46 and flows into the preload chamber 51.

The pressure of the steam St flowing into the preload chamber 51 pushes the pressure head 52 in the radial direction towards the rotor, and the radial force towards the rotor is transformed into an axial force at the inclined contact surface between the downward pressure support 53 and the moving support 50. When the loading force that moves the moving support 50 in the axial direction is smaller than the urging force of the return spring 54, the return spring 54 is supporting the moving support 50 at the position on the opposite side with respect to the moving direction of the moving support 50 moved inward by the steam pressure in the axial direction of the rotor.

At this position, contact between the sealing fins 34 on the sealing base plate 25 and the free-cutting spacers 28 on the rotor 18 can arise, and contact between the sealing fins 24 and the free-cutting spacers 28 opposed to the sealing fins 24 on the rotor 18 can arise from thermal deformation.

If this actually happens, although the free-cutting spacers 28 become recessed by contact, no damage is caused to the sealing fins 34 or 24 because of contact with the spacers 28.

For example, if the load connected to the steam turbine 3 increases and thus the pressure of the steam St flowing into the steam turbine 3 increases, the pressure of the steam St flowing into the preload chamber 51 also increases.

After this, the steam pressure pushes the pressure head 52 in the radial direction towards the rotor, and the radial force towards the rotor is transformed into an axial force at the inclined contact surface between the downward pressure support 53 and the moving support 50. When the force that moves the moving support 50, that is, the pressure of the steam St, increases above the urging force of the return spring 54, the steam pressure moves the moving support 50 in the axial direction of the rotor 18. Also, the sealing base plate 25 connected to the moving support 50 moves in the axial direction of steam pressure loading.

After the steam turbine 3 has become thermally stable, the pressure of the steam St is increased for increased turbine load. The turbine is constructed so that after the increase in the steam pressure has moved the moving support 50 to a moving position in the axial direction of steam pressure loading, not only the surfaces of the free-cutting spacers 28 on the rotor 18 that are not in contact will become opposed to the surfaces of the sealing fins 34 on the sealing base plate 25, but also will the surfaces of the free-cutting spacers 28 on the sealing base plate 25 that are not in contact become opposed to the surfaces of the sealing fins 24 on the rotor 18. Clearances between the sealing fins 34, 24 and the free-cutting spacers 28 that face each other can then be initialized when the pressure of the steam St flowing into the preload chamber 51 increases. Clearances between the sealing fins 34 and the free-cutting spacers 28 can also be initialized. The initialization will minimize the clearances between the sealing fins 34, 24 and the free-cutting spacers 28, and improve sealing performance between the stationary blade 21 and the rotor 18.

A replacement for the free-cutting spacers 28 can be those using a gas-permeable metal. Using free-cutting spacers 28 formed from the gas-permeable metal is contributory to not only preventing damage to the sealing fins 34, 24, but also removing contact heat caused by contact between the sealing fins 34, 24 and the free-cutting spacers 28, and preventing thermal deformation due to the contact heat. In the present embodiment, since the relationship between the position of the steam passageway 46 and the movement position of the moving support moved inward by the steam pressure in the axial direction of the rotor is not affected, clearances can be minimized by moving the sealing base plate 25 slightly in the axial direction, as in the first embodiment, so that compact and high-performance steam turbines can be supplied. Substantially the same advantageous effects can also be obtained in a mutually coupled high-pressure and low-pressure turbine arrangement and in a low-pressure turbine equipped with a steam intake pipeline centrally therein.

The present embodiment can also be applied to a labyrinth sealing device provided between a nozzle diaphragm outer ring 20 (see FIG. 2) and a moving blade 17 (also, see FIG. 2).

(Ninth Embodiment)

Next, a ninth embodiment of the present invention will be described.

Figure 17:
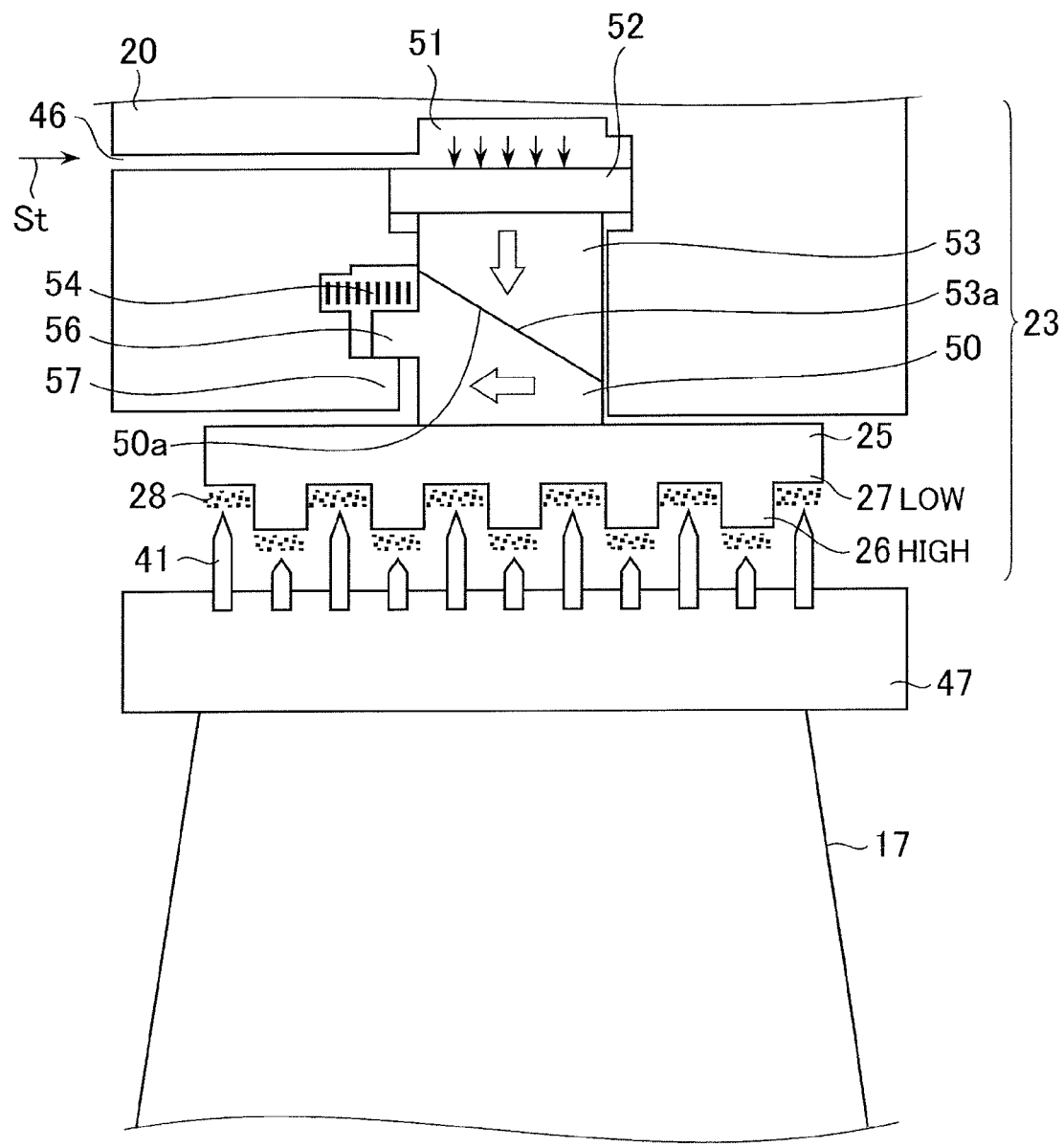
FIG. 17 is a schematic that shows a distal end of a moving blade used in a further embodiment.

As shown in FIG. 17, a sealing base plate 25 of a high-low type, for example, is used, and a plurality of high portions 26 and low portions 27, each shaped along a rotational axis, or periphery, of one moving blade 17, and lined up at alternate positions in an axial direction of a rotor 18, are formed on the sealing base plate 25.

A free-cutting spacer 28 shaped in a peripheral direction is mounted on each of the high portions 26 and low portions 27.

Free-cutting spacers 28 provided in a casing 19 (see FIG. 2) that is part of a fixed region are each constructed to be movable in the axial direction of the rotor with respect to the moving blades 17 that are part of a rotating region.

In addition, on a cover 47 of each moving blade 17, a plurality of sealing fins 41 are arranged substantially upright in a peripheral direction, at positions opposed to the high portions 26 and low portions 27 of the sealing base plate 25.

A preload chamber 51 is formed in a nozzle diaphragm outer ring 20, and a pressure head 52 that reciprocates in the radial direction towards the rotor 18 with respect to the moving blade 17 is disposed in the preload chamber 51. The pressure head 52 is connected to a downward pressure support 53. The downward pressure support 53 is in contact with a moving support 50 movable in the axial direction of the rotor 18, via a downward inclined contact surface 53a. The moving support 50 is provided in the innermost surface side of the preload chamber 51. An inclined contact surface 50a inclined in the axial direction of the rotor, along the downward inclined contact surface 53a of the downward pressure support 53, is formed at an end portion of the outer circumference surface of the moving support 50 in the radial direction towards the rotor.

A rotor-oriented radial loading pressure that the pressure head 52 has received is transformed into an axial force at the inclined contact surface between the downward pressure support 53 and the moving support 50, and the moving support 50 is pushed in an axial direction. The moving support 50 is resiliently supported by a return spring 54 (urging means), and is urged by the return spring 54 in a direction opposite to the moving direction of the moving support moved inward by the steam pressure in the axial direction of the rotor.

The preload chamber 51 is constructed to communicate with the outside of the nozzle diaphragm outer ring 20 through a steam passageway 46 so that the steam St circulating through the outside of the nozzle diaphragm outer ring 20 will flow into the preload chamber 51. The pressure head 52, when pressurized by the steam St, will be forced inward by the steam pressure. The rotor-oriented radial loading pressure that the pressure head 52 has received is transformed into an axial force at the inclined contact surface between the downward pressure support 53 and the moving support 50, and the moving support 50 is pushed in the axial direction of the rotor to move in the rotor axial direction.

The sealing base plate 25 is mounted at a front end of the moving support 50. A guide 56 is also mounted on the moving support 50. The guide 56 comes into contact with a guide acceptor 57 provided at an internal region of the nozzle diaphragm outer ring 20, in a protruding state and prevents the moving support 50 and the sealing base plate 25 from turning and taking an unstable posture when a moment of the steam pressure upon the moving support 50 and the sealing base plate 25 is applied. Smooth reciprocation in the axial direction of the rotor is thus attained.

The guide 56 is preferably formed integrally with the moving support 50, for example. A method of mounting the sealing base plate 25 on the moving support 50 is not limited; for example, screws not shown may be used to fix the sealing base plate 25 to the moving support 50.

The pressure head 52, downward pressure support 53, moving support 50, guide 56, and sealing base plate 25 included constitute a movable region of a driving unit.

The sealing base plate 25, pressure head 52, downward pressure support 53, moving support 50, guide 56, return spring 54, preload chamber 51, and steam passageway 46 included constitute a labyrinth sealing device 23.

A sealing structure that includes the labyrinth sealing device 23 and the sealing fins 41 on the moving blade 17 is built into the steam turbine 3.

When the moving support 50 of the labyrinth sealing device 23 is being supported by the urging force of the return spring 54 at a position on an opposite side with respect to a loading direction of the steam pressure, the sealing base plate 25 lies at a position shifted from the moving blade 17, on the side opposite to the loading direction of the steam pressure.

When the steam St that has been generated by a boiler 2 (see FIG. 1) flows into the steam turbine 3 (see FIG. 1), and the steam St then passes the outside of the nozzle diaphragm outer ring 20, part of the steam St circulates through the steam passageway 46 and flows into the preload chamber 51.

The pressure of the steam St flowing into the preload chamber 51 pushes the pressure head 52 in the radial direction towards the rotor, and the radial force towards the rotor is transformed into an axial force at the inclined contact surface between the downward pressure support 53 and the moving support 50. When the loading force that moves the moving support 50 in the axial direction is smaller than the urging force of the return spring 54, the return spring 54 is supporting the moving support 50 at the position on the opposite side with respect to an moving direction of the moving support moved inward by the steam pressure in the axial direction of the rotor.

When the moving support 50 is being supported by the urging force of the return spring 54 at the position on the opposite side with respect to the moving direction of the moving support moved inward by the steam pressure in the axial direction of the rotor, the sealing base plate 25 lies at a position on the opposite side with respect to the loading direction of the steam pressure. In addition, each free-cutting spacer 28 on the sealing base plate 25 already lies at a position on the side opposite to the loading direction of the steam pressure with respect to the sealing fins 41 on the cover 47 of the moving blade 17.

At this position, contact between the sealing fins 41 on the cover 47 of the moving blade 17 and the free-cutting spacers 28 on the sealing base plate 25 that face each other can arise from thermal deformation.

If this actually happens, although the free-cutting spacers 28 become recessed by contact, no damage is caused to the sealing fins 41 because of contact with the spacers 28.

If the pressure of the steam St flowing into the steam turbine 3 (see FIG. 1) increases, the steam St flowing into the preload chamber 51 also increases in pressure. After this, the steam pressure pushes the pressure head 52 in the radial direction towards the rotor, and the radial force towards the rotor is transformed into an axial force at the inclined contact surface between the downward pressure support 53 and the moving support 50. When the loading force that moves the moving support 50 in the axial direction, increases above the urging force of the return spring 54, the moving support 50 moves in the axial direction. Also, the sealing base plate 25 connected to the moving support 50 moves in an axial direction.

If the turbine is constructed so that after the steam pressure has increased and the moving support 50 has moved to a stopping position of the steam pressure loading, the surfaces of the free-cutting spacers 28 on the sealing base plate 25 that are not in contact will be opposed to the surfaces of the sealing fins 41 on the cover 47 of the moving blade 17, clearances between the sealing fins 41 and free-cutting spacers 28 that face each other can be initialized when the pressure of the steam St flowing into the preload chamber 51 increases.

The initialization will minimize the clearances between the sealing base plate 25 and the cover 47 of the moving blade 17, and improve sealing performance between the nozzle diaphragm outer ring 20 and the moving blade 17.

Therefore, efficiency of the steam turbine 3 improves.

In addition, flexibility of design can be enhanced without being affected by the relationship between the position of the steam passageway 46 and the movement position of the moving support moved inward by the steam pressure in the axial direction of the rotor.

Furthermore, since the steam St circulating in the steam turbine 3 (see FIG. 1) decreases in pressure while expanding downstream from an upstream side of the steam, the labyrinth sealing device 23 may, as with the labyrinth sealing device 23 shown in FIG. 10, be constructed so that the return springs 54 at more downstream positions in the flow direction of the steam St have a smaller urging force.

While the labyrinth sealing device 23 shown in FIG. 16 is constructed so that free-cutting spacers 28 are mounted on the sealing base plate 25 and the sealing fins 41 on the cover 47, sealing fins may be arranged on the sealing base plate 25 and free-cutting spacers on the cover 47.

Further alternatively, sealing fins may be arranged on both of the sealing base plate 25 and the cover 47. In this case, free-cutting spacers 28 will be mounted at positions of the cover 47 that are opposed to the sealing fins on the sealing base plate side, and at positions of the sealing base plate 25 that are opposed to the sealing fins on the cover side.

While embodiments of the present invention have been described above, the invention is not limited to the embodiments and may be appropriately redesigned without departing from the scope of the invention.

(Tenth Embodiment)

Next, a tenth embodiment of the present invention will be described.

Figure 18:
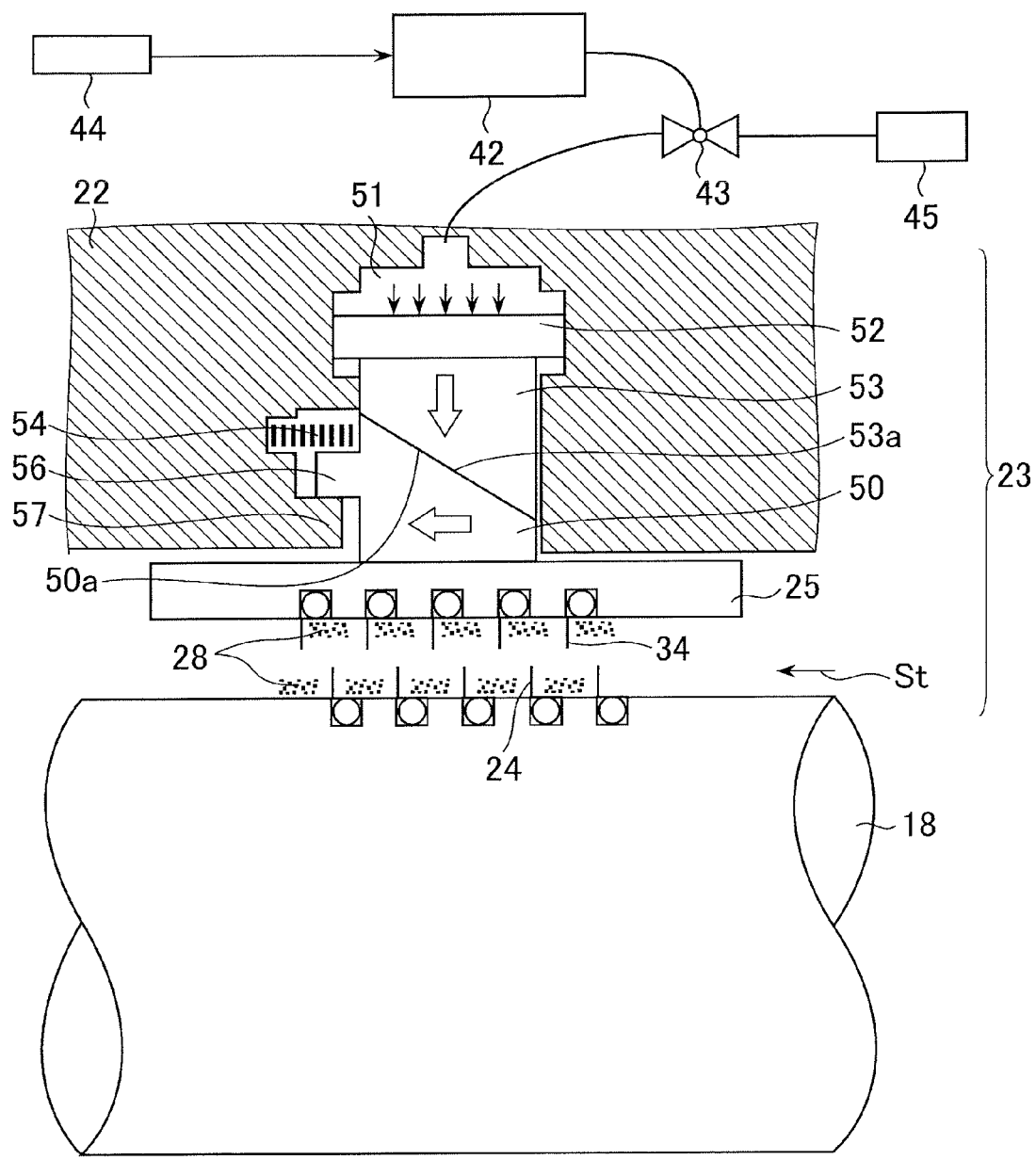
FIG. 18 is a schematic that shows an example of a further labyrinth sealing device configuration that introduces driving steam from a high-pressure steam supply into a preload chamber and moves a pressure head.

The pressure head 52 in the labyrinth sealing device 23 shown in FIG. 16 is driven by the pressure of the steam St flowing through the steam turbine 3, but as shown in FIG. 18, for example, a pressure of steam flowing from a high-pressure steam supply 45 into a preload chamber 51 to drive a pressure head 52 may be used to drive the pressure head 52 in a radial direction towards a rotor. In addition, the radial force towards the rotor may then be transformed into axial force at an inclined contact surface between a downward pressure support 53 and a moving support 50, and the moving support 50 may be moved in an axial direction of the rotor 18.

A labyrinth sealing device 23 shown in FIG. 18 includes a preload chamber 51, a pressure head 52, a downward pressure support 53, a moving support 50, for example a return spring 54, a sealing base plate 25, a valve control device 42, an operational state detector 44, a high-pressure steam supply 45, and an electromagnetic valve 43.

The sealing base plate 25 is substantially of the same configuration as that of the sealing base plate 25 of the labyrinth sealing device 23 shown in FIG. 16.

A sealing structure that includes, in addition to the labyrinth sealing device 23, both of sealing fins 24 and free-cutting spacers 28 mounted on a rotor side, is built into a steam turbine 3.

The high-pressure steam supply 45 is connected to the preload chamber 51 via the electromagnetic valve 43. The valve control device 42 that controls open/close actions of the electromagnetic valve 43 is also connected.

The valve control device 42 is suitably constructed to control the opening or closing of the electromagnetic valve 43, according to an operational state of the steam turbine 3, and for this purpose, the operational state detector 44 is provided to detect the operational state of the steam turbine 3.

In this configuration, the valve control device 42 can move a movable region, inclusive of the pressure head 52, the downward pressure support 53, the moving support 50, and the sealing base plate 25, in an axial direction of the rotor 18 according to the particular operational state of the steam turbine 3. Steam temperature, vibration of the rotor 18, and other factors, as well as steam pressure, can be used to discriminate operational states that become unstable in case of thermal deformation of a casing, thermal deformation of a diaphragm, or other events. Not only thermal deformation levels of the casing and diaphragm, but also a differential level of thermal elongation that is derived by subtracting an axial thermal elongation level of the casing from that of the rotor can be used to discriminate the operational states that become unstable.

A driving unit is constructed that includes the reload chamber 51, the valve control device 42, the high-pressure steam supply 45, and the electromagnetic valve 43.

The operational state of the steam turbine 3 at a particular time is suitably detected from the vibration level of the steam turbine rotor 18, the steam temperature and/or steam pressure of the steam turbine 3, and/or the differential level of thermal elongation that is derived by subtracting the axial thermal elongation level of the casing from that of the rotor. State detection is described for each kind of parameter.

First Example

It is preferable that the operational state of the steam turbine 3 be detected from the vibration level of its rotor 18. The operational state detector 44 operates as a rotor vibration detector to detect the steam turbine rotor vibration (vibration amplitude, vibration phase, or both thereof).

The operational state detector 44 that is the rotor vibration detector detects the vibration (vibration amplitude, vibration phase, or both thereof) of the steam turbine rotor 18, converts the detected vibration level into a detection signal, and inputs the signal to the valve control device 42.

The valve control device 42 calculates the rotor vibration from the detection signal input from the operational state detector 44, the rotor vibration detector.

When the calculated rotor vibration level is equal to or higher than a preset rotor vibration level, the valve control device 42 transmits a control signal to the electromagnetic valve 43 to close this electromagnetic valve.

The preset rotor vibration level is desirably an appropriate value determined from steam turbine performance characteristics or the like.

In accordance with the control signal received from the valve control device 42, the electromagnetic valve 43 closes to cut off the flow of the driving steam from the high-pressure steam supply 45 into the preload chamber 51.

When no driving steam is flowing into the preload chamber 51, the urging force of the return spring 54 moves the moving support 50 in the direction opposite to the steam pressure loading direction.

Upon the moving support 50 being moved in the direction opposite to the steam pressure loading direction, the sealing base plate 25 also moves in the direction opposite to the steam pressure loading direction. At this position, contact between the sealing fins 34 on the sealing base plate 25 and the free-cutting spacers 28 that face each other, and contact between the sealing fins 24 on the rotor 18 and the free-cutting spacers 28 that face each other can arise from thermal deformation.

If this actually happens, although the free-cutting spacers 28 become recessed by contact, no damage is caused to the sealing fins 34 or 24 because of contact with the spacers 28.

When the calculated rotor vibration level is lower than the preset rotor vibration level, the valve control device 42 transmits a control signal to the electromagnetic valve 43 to open this electromagnetic valve.

In accordance with the control signal received from the valve control device 42, the electromagnetic valve 43 opens to cause the driving steam to flow from the high-pressure steam supply 45 into the preload chamber 51.

The pressure of the driving steam flowing from the high-pressure steam supply 45 into the preload chamber 51 moves the pressure head 52 in the radial direction towards the rotor.

Upon the pressure head 52 being moved in the radial direction towards the rotor, the radial movement is transformed into a movement of the moving support 50 in the axial direction of the rotor, at an inclined contact surface between the downward pressure support 53 and the moving support 50, then the steam pressure moves the moving support 50 in the axial direction of the rotor 18, and the sealing base plate 25 connected to the moving support 50 moves in an axial loading direction of the steam pressure. The turbine is constructed so that after the sealing base plate 25 has moved to a stopping position of the steam pressure loading, not only the surfaces of the free-cutting spacers 28 on the rotor 18 that are not in contact will become opposed to the surfaces of the sealing fins 34 on the sealing base plate 25, but also will the surfaces of the free-cutting spacers 28 on the sealing base plate 25 that are not in contact become opposed to the surfaces of the sealing fins 24 on the rotor 18. Clearances between the sealing fins 34, 24 and the free-cutting spacers 28 that face each other can then be initialized when the pressure of the steam St flowing into the preload chamber 51 increases. The initialization will minimize the clearances between the sealing fins 34, 24 and the free-cutting spacers 28, and improve sealing performance between the stationary blade 21 and the rotor 18.

Second Example

It is preferable that the operational state of the steam turbine 3 be detected from the steam temperature of the steam turbine 3. The operational state detector 44 operates as a steam temperature detector to detect the steam temperature of the steam turbine 3.

The operational state detector 44 as the steam temperature detector, detects the steam temperature of the steam turbine 3, converts the detected steam temperature into a detection signal, and inputs the signal to the valve control device 42.

The valve control device 42 calculates the steam temperature from the detection signal input from the operational state detector 44, the steam temperature detector.

When the calculated steam temperature is lower than a preset steam temperature, the valve control device 42 transmits a control signal to the electromagnetic valve 43 to close this electromagnetic valve.

The preset steam temperature is desirably an appropriate value determined from steam turbine performance characteristics or the like.

In accordance with the control signal received from the valve control device 42, the electromagnetic valve 43 closes to cut off the flow of the driving steam from the high-pressure steam supply 45 into the preload chamber 51.

When no driving steam is flowing into the preload chamber 51, the urging force of the return spring 54 moves the moving support 50 in the direction opposite to the steam pressure loading direction.

Upon the moving support 50 being moved in the direction opposite to the steam pressure loading direction, the sealing base plate 25 also moves in the direction opposite to the steam pressure loading direction. At this position, contact between the sealing fins 34 on the sealing base plate 25 and the free-cutting spacers 28 that face each other, and contact between the sealing fins 24 on the rotor 18 and the free-cutting spacers 28 that face each other can arise from thermal deformation.

If this actually happens, although the free-cutting spacers 28 become recessed by contact, no damage is caused to the sealing fins 34 or 24 because of contact with the spacers 28.

When the calculated steam temperature is equal to or higher than the preset steam temperature, the valve control device 42 transmits a control signal to the electromagnetic valve 43 to open this electromagnetic valve.

In accordance with the control signal received from the valve control device 42, the electromagnetic valve 43 opens to cause the driving steam to flow from the high-pressure steam supply 45 into the preload chamber 51.

The pressure of the driving steam flowing from the high-pressure steam supply 45 into the preload chamber 51 moves the pressure head 52 in the radial direction towards the rotor.

Upon the pressure head 52 being moved in the radial direction towards the rotor, the radial movement is transformed into a movement of the moving support 50 in the axial direction of the rotor, at the inclined contact surface between the downward pressure support 53 and the moving support 50, then the steam pressure moves the moving support 50 in the axial direction of the rotor 18, and the sealing base plate 25 connected to the moving support 50 moves in the axial loading direction of the steam pressure. The turbine is constructed so that after the sealing base plate 25 has moved to the stopping position of the steam pressure loading, not only the surfaces of the free-cutting spacers 28 on the rotor 18 that are not in contact will become opposed to the surfaces of the sealing fins 34 on the sealing base plate 25, but also will the surfaces of the free-cutting spacers 28 on the sealing base plate 25 that are not in contact become opposed to the surfaces of the sealing fins 24 on the rotor 18. Clearances between the sealing fins 34, 24 and the free-cutting spacers 28 that face each other can then be initialized when the pressure of the steam St flowing into the preload chamber 51 increases. The initialization will minimize the clearances between the sealing fins 34, 24 and the free-cutting spacers 28, and improve sealing performance between the stationary blade 21 and the rotor 18.

Third Example

The operational state of the steam turbine 3 may be detected from the pressure of the steam St, in which case the operational state detector 44 operates as a pressure detector to detect the pressure of the steam St.

The operational state detector 44 as the pressure detector, detects the pressure of the steam St circulating through the steam turbine 3, then inputs an appropriate detection signal to the valve control device 42, and causes the valve control device 42 to calculate the pressure of the steam St.

When the calculated steam pressure is lower than a preset pressure, the valve control device 42 transmits a control signal to the electromagnetic valve 43 to close this electromagnetic valve.

In accordance with the control signal received from the valve control device 42, the electromagnetic valve 43 closes to cut off the flow of the driving steam from the high-pressure steam supply 45 into the preload chamber 51.

The preset pressure value is desirably an appropriate value determined from steam turbine performance characteristics or the like.

When no driving steam is flowing into the preload chamber 51, the urging force of the return spring 54 moves the moving support 50 in the direction opposite to the steam pressure loading direction.

Upon the moving support 50 being moved in the direction opposite to the steam pressure loading direction, the sealing base plate 25 also moves in the direction opposite to the steam pressure loading direction. At this position, contact between the sealing fins 34 on the sealing base plate 25 and the free-cutting spacers 28 that face each other, and contact between the sealing fins 24 on the rotor 18 and the free-cutting spacers 28 that face each other can arise from thermal deformation.

If this actually happens, although the free-cutting spacers 28 become recessed by contact, no damage is caused to the sealing fins 34 or 24 because of contact with the spacers 28.

When the calculated steam pressure is equal to or greater than the preset steam pressure, the valve control device 42 transmits a control signal to the electromagnetic valve 43 to open this electromagnetic valve.

In accordance with the control signal received from the valve control device 42, the electromagnetic valve 43 opens to cause the driving steam to flow from the high-pressure steam supply 45 into the preload chamber 51.

The pressure of the driving steam flowing from the high-pressure steam supply 45 into the preload chamber 51 moves the pressure head 52 in the radial direction towards the rotor.

Upon the pressure head 52 being moved in the radial direction towards the rotor, the radial movement is transformed into a movement of the moving support 50 in the axial direction of the rotor, at the inclined contact surface between the downward pressure support 53 and the moving support 50, then the steam pressure moves the moving support 50 in the axial direction of the rotor 18, and the sealing base plate 25 connected to the moving support 50 moves in the axial loading direction of the steam pressure. The turbine is constructed so that after the sealing base plate 25 has moved to the stopping position of the steam pressure loading, not only the surfaces of the free-cutting spacers 28 on the rotor 18 that are not in contact will become opposed to the surfaces of the sealing fins 34 on the sealing base plate 25, but also will the surfaces of the free-cutting spacers 28 on the sealing base plate 25 that are not in contact become opposed to the surfaces of the sealing fins 24 on the rotor 18. Clearances between the sealing fins 34, 24 and the free-cutting spacers 28 that face each other can then be initialized when the pressure of the steam St flowing into the preload chamber 51 increases. The initialization will minimize the clearances between the sealing fins 34, 24 and the free-cutting spacers 28, and improve sealing performance between the stationary blade 21 and the rotor 18.

Fourth Example

The operational state of the steam turbine 3 may be detected from the differential thermal elongation level derived by subtracting the axial thermal elongation level of the casing from that of the rotor. In this case, the operational state detector 44 operates as a differential thermal elongation detector to detect the differential thermal elongation level of the steam turbine.

The operational state detector 44 as the differential thermal elongation detector, detects the differential thermal elongation level of the steam turbine 3, then inputs an appropriate detection signal to the valve control device 42, and causes the valve control device 42 to calculate the differential thermal elongation.

When the calculated differential thermal elongation level is lower than a preset differential thermal elongation level, the valve control device 42 transmits a control signal to the electromagnetic valve 43 to close this electromagnetic valve.

In accordance with the control signal received from the valve control device 42, the electromagnetic valve 43 closes to cut off the flow of the driving steam from the high-pressure steam supply 45 into the preload chamber 51.

The preset differential thermal elongation level is desirably an appropriate value determined from steam turbine performance characteristics or the like.

When no driving steam is flowing into the preload chamber 51, the urging force of the return spring 54 moves the moving support 50 in the direction opposite to the steam pressure loading direction.

Upon the moving support 50 being moved in the direction opposite to the steam pressure loading direction, the sealing base plate 25 also moves in the direction opposite to the steam pressure loading direction. At this position, contact between the sealing fins 34 on the sealing base plate 25 and the free-cutting spacers 28 that face each other, and contact between the sealing fins 24 on the rotor 18 and the free-cutting spacers 28 that face each other can arise from thermal deformation.

If this actually happens, although the free-cutting spacers 28 become recessed by contact, no damage is caused to the sealing fins 34 or 24 because of contact with the spacers 28.

When the calculated differential thermal elongation level is equal to or higher than the preset differential thermal elongation level, the valve control device 42 transmits a control signal to the electromagnetic valve 43 to open this electromagnetic valve.

In accordance with the control signal received from the valve control device 42, the electromagnetic valve 43 opens to cause the driving steam to flow from the high-pressure steam supply 45 into the preload chamber 51.

The pressure of the driving steam flowing from the high-pressure steam supply 45 into the preload chamber 51 moves the pressure head 52 in the radial direction towards the rotor.

Upon the pressure head 52 being moved in the radial direction towards the rotor, the radial movement is transformed into a movement of the moving support 50 in the axial direction of the rotor, at the inclined contact surface between the downward pressure support 53 and the moving support 50, then the steam pressure moves the moving support 50 in the axial direction of the rotor 18, and the sealing base plate 25 connected to the moving support 50 moves in the axial loading direction of the steam pressure. The turbine is constructed so that after the sealing base plate 25 has moved to the stopping position of the steam pressure loading, not only the surfaces of the free-cutting spacers 28 on the rotor 18 that are not in contact will become opposed to the surfaces of the sealing fins 34 on the sealing base plate 25, but also will the surfaces of the free-cutting spacers 28 on the sealing base plate 25 that are not in contact become opposed to the surfaces of the sealing fins 24 on the rotor 18. Clearances between the sealing fins 34, 24 and the free-cutting spacers 28 that face each other can then be initialized when the pressure of the steam St flowing into the preload chamber 51 increases. The initialization will minimize the clearances between the sealing fins 34, 24 and the free-cutting spacers 28, and improve sealing performance between the stationary blade 21 and the rotor 18.

Examples of employing one detection item during operational state detection with the operational state detector 44 have been described in FIG. 18. However, a configuration may be adopted that detects a plurality of items at the same time.

For example, during operational state detection, when the temperature and pressure of the steam are detected, only if both values are equal to or greater than the respective presettings, may the pressure head 52 be moved in the loading direction of the steam pressure. None of these configurations is discrepant from the present invention in terms of the nature and essence thereof.

The free-cutting spacers 28 can be replaced by those which use a gas-permeable metal. Using free-cutting spacers 28 formed from a gas-permeable metal is contributory to not only preventing damage to the sealing fins 34, 24, but also removing contact heat caused by contact between the sealing fins 34, 24 and the free-cutting spacers 28, and preventing thermal deformation due to the contact heat.

In addition, while the labyrinth sealing device 23 shown in FIG. 18 is constructed to load the pressure head 52 by introducing the driving steam from the high-pressure steam supply 45 into the preload chamber 51, the sealing device may instead be constructed to load the pressure head 52 using, for example, an actuator not shown.

Furthermore, the sealing structure built in between the nozzle diaphragm outer ring 20 and the moving blade 17 may be of the same construction as that of the sealing structure shown in FIG. 10.

As described above, in the steam turbine 3 of the present embodiment, the sealing structure that includes the labyrinth sealing device 23, the sealing fins 24 on the rotor 18, and the free-cutting spacers 28 on the sealing base plate 25, is built in between each stationary blade 21 forming part of the fixed region, and the rotor 18 forming part of the rotating region. This sealing structure is shown in FIG. 10. The sealing base plate 25 with the free-cutting spacers 28 is mounted to be movable in the axial direction of the rotor 18.

In this configuration, when the load of the steam turbine 3 increases, the pressure head 52 moves in the radial direction towards the rotor. This radial movement is transformed into a movement of the moving support 50 in the axial direction of the rotor, at the inclined contact surface between the downward pressure support 53 and the moving support 50, then the steam pressure moves the moving support 50 in the axial direction of the rotor 18, and the sealing base plate 25 connected to the moving support 50 moves in the axial direction of steam pressure loading. The free-cutting spacers 28 at the positions opposed to those of the sealing fins 24 existing after the axial movement, are maintained in a non-contact state. The clearances between the sealing fins 24 and the free-cutting spacers 28, therefore, are dimensionally minimized, which then improves sealing performance between each stationary blade 21 and the rotor 18.

This in turn yields excellent effects in that sealing performance between each stationary blade 21 and the rotor 18 improves and in that a decrease in turbine efficiency due to steam leakage is suppressed.

Additionally, the steam turbine is constructed so that the free-cutting spacers 28 are each formed using a free-cutting metal that is an abradable material excellent in workability. This construction develops a further effect in that even if the sealing fins 34, 24 and the free-cutting spacers 28 come into contact, the sealing fins 34, 24 is prevented from being damaged since only the free-cutting spacers 28 are abraded. In the present embodiment, since the relationship between the position of the steam passageway 46 and the movement position of the moving support moved inward by the steam pressure in the axial direction of the rotor is not affected, clearances can be minimized by moving the sealing base plate 25 slightly in the axial direction, as in the first embodiment, so that compact and high-performance steam turbines can be supplied. Substantially the same advantageous effects can also be obtained in a mutually coupled high-pressure and low-pressure turbine arrangement and in a low-pressure turbine equipped with a steam intake pipeline centrally therein.

The position of the sealing structure which, as shown in FIG. 10, for example, includes the labyrinth sealing device 23, the sealing fins 24, and the free-cutting spacers 28, is not limited to a position between the nozzle diaphragm inner ring 22 and the rotor 18; the sealing structure may be built in between another fixed region and the rotating region, such as between the casing 19 (see FIG. 2) and the rotor 18.

The invention claimed is:

1. A sealing device for a steam turbine which includes a rotating region formed by a rotor and a member constructed to rotate integrally with the rotor, and a fixed region formed by a casing containing the rotating region, and by a member fixed to the casing, the sealing device being built into the steam turbine, the sealing device comprising:
   sealing fins provided in both or either of the rotating region and the fixed region; and
   spacers provided on the rotating region or fixed region, both facing the sealing fins, the spacers each using a free-cutting metal; wherein
   the fixed region includes a movable region that moves in the axial direction of the rotor by a pressure action of steam circulating through the steam turbine, the movable region being further constructed to move when urged by urging means acting in a direction opposite to that of the pressure action of the steam;
   when the fixed region includes each sealing fin, the sealing fin is mounted on the movable region, and each of the sealing fins is disposed to move in an axial direction of the rotor with respect to the rotating region;
   when the fixed region includes each spacer, the spacer is mounted on the movable region, and each of the spacers is disposed to move in the axial direction of the rotor with respect to the rotating region;
   when the fixed region includes the sealing fins and the spacers, the sealing fins and the spacers included in the fixed region are mounted on the movable region, and the sealing fins and the spacers included in the fixed region are disposed to move in the axial direction of the rotor with respect to the rotating region;
   when a loading pressure that the steam applies to move the movable region in the axial direction of the rotor is smaller than an urging force that the urging means uses to urge the movable region in the opposite direction, the sealing fin and spacer that face each other are ready to come into contact with each other; and
   upon the loading pressure exceeding the urging force, the movable region moves to a position at which a clearance between the sealing fin and spacer that face each other reaches a preset value.

2. The sealing device for the steam turbine according to claim 1,
   wherein: the movable region includes a sealing base plate to which the sealing fin or the spacer is fixed, a pressure head to which the sealing base plate is fixed and which receives the loading pressure of the steam, and a guide provided on the pressure head; and
   the fixed region includes a preload chamber that internally retains the pressure head, a guide acceptor provided in the preload chamber to support the guide and guide the pressure head in an axial direction of the rotor, a steam passageway that communicates with the preload chamber and guides into the preload chamber the steam circulating through the steam turbine, and a spring that imparts an urging force to the pressure head.

3. The sealing device for the steam turbine according to claim 1,
   the sealing device comprising:
   a valve provided on a steam passageway for moving the movable region controls a supply rate of the steam;
   an operational state detector detects an operational state of the steam turbine; and
   a control device controls a moving distance of the movable region by controlling an opening angle of the valve in accordance with a signal from the operational state detector.

4. The sealing device for the steam turbine according to claim 3,
   wherein: the operational state detector is a rotor vibration detector that detects a vibration level of the rotor, the detector using the vibration level of the rotor to detect the operational state of the steam turbine; and
   the control device, upon the rotor vibration level being equal to or less than a predetermined value, moves the movable region to a rotor axial position at which a clearance between the sealing fin and spacer reaches a preset value.

5. The sealing device for the steam turbine according to claim 3,
   wherein: the operational state detector is a temperature detector that detects a temperature of the steam, the detector using the temperature of the steam to detect the operational state of the steam turbine; and
   the control device, upon the steam temperature exceeding a predetermined value, moves the movable region to a rotor axial position at which a clearance between the sealing fin and spacer reaches a preset value.

6. The sealing device for the steam turbine according to claim 3,
   wherein: the operational state detector is a pressure detector that detects a pressure of the steam, the detector using the steam pressure to detect the operational state of the steam turbine; and the control device, upon the steam pressure exceeding a predetermined value, moves the movable region to a rotor axial position at which a clearance between the sealing fin and spacer reaches a preset value.

7. The sealing device for the steam turbine according to claim 3,
wherein: the operational state detector is a differential thermal elongation detector that detects a difference in axial thermal elongation level between the rotor and the casing, the detector using the differential thermal elongation level to detect the operational state of the steam turbine; and
the control device, upon the differential thermal elongation level exceeding a predetermined value, moves the movable region to a rotor axial position at which a clearance between the sealing fin and spacer reaches a preset value.

8. The sealing device for the steam turbine according to claim 1, wherein the free-cutting metal is a gas-permeable metal.

9. A method for controlling a sealing device for a steam turbine which includes a rotating region formed by a rotor and a member constructed to rotate integrally with the rotor, and a fixed region formed by a casing containing the rotating region, and by a member fixed to the casing, the sealing device being built into the steam turbine and being inclusive of sealing fins provided in both or either of the rotating region and the fixed region, and spacers provided on the rotating region or fixed region, both facing the sealing fins, the spacers each using a free-cutting metal, the method comprising:
a sequence which, when the sealing fins are disposed on the fixed region, includes in addition to executing steady load operation of the steam turbine, moving each of the sealing fins of the fixed region in the axial direction of the rotor so that the sealing fin moves to a position at which a clearance between the sealing fin and spacer that face each other reaches a preset value;
a sequence which, when the spacers are disposed on the fixed region, includes in addition to executing steady load operation of the steam turbine, moving each of the spacers of the fixed region in an axial direction of the rotor so that the spacer moves to a position at which a clearance between the sealing fin and spacer that face each other reaches a preset value;
a sequence which, when the sealing fins and the spacers are disposed on the fixed region, includes in addition to executing steady load operation of the steam turbine, moving each of the sealing fins and spacers of the fixed region in an axial direction of the rotor so that the spacer moves to a position at which a clearance between the sealing fin and spacer that face each other reaches a preset value: and
a sequence which detects vibration of the rotor,
wherein, upon a level of the rotor vibration being equal to or lower than a predetermined rotor vibration level, the sealing fin or spacer on the fixed region side moves to the position at which the clearance between the sealing fin and spacer that face each other reaches the preset value.

10. The sealing device control method according to claim 9, further comprising:
a sequence which detects a temperature of steam,
wherein, upon the steam temperature being equal to or higher than a predetermined steam temperature, the sealing fin or spacer on the fixed region side moves to the position at which the clearance between the sealing fin and spacer that face each other reaches the preset value.

11. The sealing device control method according to claim 9, further comprising:
a sequence which detects a pressure of steam circulating through the steam turbine,
wherein, upon the steam pressure being equal to or greater than a predetermined pressure value, the sealing fin or spacer on the fixed region side moves to the position at which the clearance between the sealing fin and spacer that face each other reaches the preset value.

12. The sealing device control method according to claim 9, further comprising:
a sequence which detects a difference in axial thermal elongation level between the rotor and the casing,
wherein, upon the differential thermal elongation level being equal to or higher than a predetermined differential thermal elongation level, the sealing fin or spacer on the fixed region side moves to the position at which the clearance between the sealing fin and spacer that face each other reaches the preset value.

13. The sealing device control method according to claim 9, wherein the free-cutting metal is a gas-permeable metal.

14. A sealing device for a steam turbine which includes a rotating region formed by a rotor and a member constructed to rotate integrally with the rotor, and a fixed region formed by a casing containing the rotating region, and by a member fixed to the casing, the sealing device being built into the steam turbine, the sealing device comprising:
sealing fins provided in both or either of the rotating region and the fixed region and projected in the radial direction of the rotor; and
spacers provided in both or either of the rotating region and the fixed region, both facing the sealing fins, the spacers each using a free-cutting metal, wherein
when the fixed region includes the sealing fins, upon a driving mechanism, the sealing fins included in the fixed region move to positions opposed to surfaces of the spacer that are not cut, from positions opposed to regions of the spacer that are already cut, in an axial direction of the rotor with respect to the rotating region; and
when the fixed region includes the spacers, since the spacers included in the fixed region move in the axial direction of the rotor with respect to the rotating region by the driving mechanism, the sealing fins included in the rotating region move to positions opposed to surfaces of the spacer that are not cut, from positions opposed to regions of the spacer that are already cut.

* * * * *